(12) United States Patent
Kawamoto

(10) Patent No.: US 9,926,988 B2
(45) Date of Patent: Mar. 27, 2018

(54) STARTING CLUTCH CONTROL DEVICE FOR AUTOMATIC TRANSMISSION

(71) Applicant: Nissan Motor Co., Ltd., Kanagawa (JP)

(72) Inventor: Yoshinobu Kawamoto, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 347 days.

(21) Appl. No.: 14/761,737

(22) PCT Filed: Nov. 22, 2013

(86) PCT No.: PCT/JP2013/081461
§ 371 (c)(1),
(2) Date: Jul. 17, 2015

(87) PCT Pub. No.: WO2014/112203
PCT Pub. Date: Jul. 24, 2014

(65) Prior Publication Data
US 2015/0362026 A1  Dec. 17, 2015

(30) Foreign Application Priority Data
Jan. 17, 2013  (JP) ................................ 2013-006169

(51) Int. Cl.
*F16D 48/02* (2006.01)
*F16D 48/06* (2006.01)
(Continued)

(52) U.S. Cl.
CPC ............. *F16D 48/08* (2013.01); *F16D 48/02* (2013.01); *F16D 48/06* (2013.01); *F16H 61/00* (2013.01);
(Continued)

(58) Field of Classification Search
None
See application file for complete search history.

(56) References Cited

U.S. PATENT DOCUMENTS

2004/0038776 A1* 2/2004 Kuhstrebe .............. B60K 6/485
477/77
2004/0166992 A1* 8/2004 Buchanan ............... F16D 48/06
477/181

(Continued)

FOREIGN PATENT DOCUMENTS

| EP | 2290254 A1 | 3/2011 |
|---|---|---|
| JP | 2006-038057 A | 2/2006 |
| JP | 2012-127448 A | 7/2012 |

*Primary Examiner* — Jacob S. Scott
(74) *Attorney, Agent, or Firm* — Osha Liang LLP; Thomas K. Scherer; Jonathan P. Osha

(57) ABSTRACT

A starting clutch control device for an automatic transmission has a starting clutch controller. The starting control device controls a transmission torque capacity of a starting clutch interposed in a transmission path in which rotation of the power source is transmitted to wheels while shifting is underway by the automatic transmission. The starting clutch controller controls the transmission torque capacity of the starting clutch such that a rotation trajectory of the power source develops as desired in a low rotation speed range in which the transmission torque capacity control of the starting clutch is necessary. The starting clutch controller causes the transmission torque capacity of the starting clutch to change, when a shift of the automatic transmission occurs during the transmission torque capacity control by the starting clutch controller, in a direction in which the change in the rotation trajectory will occur corresponding to the shift.

4 Claims, 12 Drawing Sheets

(51) Int. Cl.
*F16D 48/08* (2006.01)
*F16H 61/00* (2006.01)

(52) U.S. Cl.
CPC ............... *F16D 2500/1083* (2013.01); *F16D 2500/1085* (2013.01); *F16D 2500/1087* (2013.01); *F16D 2500/1088* (2013.01); *F16D 2500/3067* (2013.01); *F16D 2500/30806* (2013.01); *F16D 2500/3108* (2013.01); *F16D 2500/31466* (2013.01); *F16D 2500/50287* (2013.01); *F16D 2500/50684* (2013.01); *F16D 2500/7027* (2013.01); *F16D 2500/70247* (2013.01); *F16D 2500/70282* (2013.01); *F16D 2500/70605* (2013.01); *F16H 2306/40* (2013.01); *F16H 2312/02* (2013.01)

(56) References Cited

U.S. PATENT DOCUMENTS

2005/0064987 A1* 3/2005 Budal .................... B60K 28/16
                                                        477/3
2009/0137364 A1* 5/2009 Honma ................... F16D 48/06
                                                        477/175
2009/0299590 A1* 12/2009 Nedachi ................ F16D 48/066
                                                        701/68
2010/0261577 A1* 10/2010 MacFarlane ............ F16D 48/06
                                                        477/84

* cited by examiner

Upshift

Downshift

STARTING CLUTCH CONTROL DEVICE FOR AUTOMATIC TRANSMISSION

CROSS-REFERENCE TO RELATED APPLICATIONS

The present application is a national stage application of PCT/JP2013/081461, filed Nov. 22, 2013, and claims foreign priority to Japanese Patent Application No. 2013-006169, filed Jan. 17, 2013, the contents of which are incorporated by reference in their entirety.

BACKGROUND

Technical Field

The present invention relates to a control device for controlling a transmission torque capacity of a starting clutch interposed in a torque transmission path to transmit a rotation of a power or driving source such as an engine to wheels during shift by an automatic transmission which is not limited to an automated manual transmission AMT which automates a manual transmission, a stepped automatic transmission of planetary gear type, but also includes a V-belt type continuously variable transmission or a toroidal-type continuously variable transmission.

Related Art

It is usual to configure the automatic transmission such that the wheels are kept in a stopped state or in a creeping or low speed state with the driving source in operation by restricting the power from the power source to the wheels to a negligible level at low rotation speed by a hydraulic power transmission mechanism such as a torque converter which is interposed in the transmission path.

However, the fluid transmitting mechanism is inevitably accompanied by deterioration in the transmission efficiency due to a difference between input and output rotational speed (slip).

Therefore, such a system is proposed in which, in place of the hydraulic transmission mechanism, a starting clutch is interposed in the transmission path described above, which may control the torque transmission capacity.
Such a transmission torque capacity control technique of the starting clutch is conventionally known and described in Patent Document 1, for example.

The transmission torque capacity control technique of the starting clutch in this document discloses that; (a) in a vehicle stopping state, the transmission torque capacity (engaging force) of the starting clutch is controlled in a manner in which creep torque can be transmitted (creep torque control), and (b) when starting from the vehicle stopping state, i.e., in a predetermined low vehicle speed range (when a torque converter is interposed, in a state in which the torque converter should be released from a lock-up state to disconnect input and output elements so as not to be connected directly) during a period in which the starting clutch is completely engaged from a released state, the transmission torque capacity (engaging force) is controlled such that the engine speed trajectory or path representing change of the engine rotational speed over time will assume a desired rotational trajectory that does not cause the start shock and starting delay (engine rotation trajectory control).

Incidentally, when performing the engine rotation trajectory control described in (b), the transmission torque capacity command value Tc of the starting clutch is calculated by the following equation.

$$Tc = C \times (Ne - Neoff)^2 \qquad (1)$$

Whereby,
C: torque capacity coefficient of the starting clutch
Ne: engine rotation speed
Neoff: engine rotation correction amount
Thus, by performing the engagement control of the starting clutch in order for the transmission torque capacity to attain the command value Tc described above, the engine rotation trajectory will be controlled as desired.

Patent Document 1: JP 2006-038057 A

SUMMARY

However, in the conventional technique proposed as described above, when executing the engine rotation trajectory control, the starting clutch is controlled in engagement force to achieve the command value Tc obtained in the above equation (1) without considering shifting of the automatic transmission. Thus, when shifting of the automatic transmission occurs during the engine rotation trajectory control during the engine rotation trajectory control, despite the actual shifting operation of the automatic transmission, the control of the engine rotation trajectory does not cause any change in the engine rotation trajectory corresponding to the shift operation, but the desired rotation trajectory described above will be maintained.

By the way, the driver drives a vehicle while perceiving a shift operation via the rotation speed change on the input side (i.e. change in engine rotation speed). Thus, if no change occurs in the engine rotation trajectory associated with the shift, the driver will be forced to drive the vehicle without perceiving the shift operation, which would impart a feeling of strangeness or discomfort.

The discomfort becomes particularly noticeable when he or she shifts the automatic transmission via a manual shifting operation with the automatic transmission set in a manual shift mode.
The reason is that the manual shift is a deliberate shifting operation of the driver who is performing a manual shifting operation while expecting change in rotation speed on the input side of the automatic transmission (i.e change in engine speed) associated with that shift.

According to one or more embodiments of the present invention, a device for a starting clutch is proposed, in which the transmission torque capacity control is executed so that a change in the rotation trajectory will be produced in response to shifting operation when a shift of the automatic transmission occurs even during the rotation trajectory control described above.

According to one or more embodiments of the present invention, the starting clutch control device for an automatic transmission is configured to include the following features. First, a description is given of the premise configuration of a starting clutch control device, which is intended to control a transmission torque capacity of a starting clutch interposed in a transmission path in which a rotation of the power source is transmitted to wheels while shifting is underway by the automatic transmission.

The starting clutch control device according to one or more embodiments of the present invention includes a starting clutch control means that controls the transmission torque capacity of the starting clutch in order for a rotation trajectory of the power source will develop as desired in a low rotation speed range in which the transmission torque capacity control of the starting clutch is required.
Further, the starting clutch control means is configured to cause the transmission torque capacity of the starting clutch to change, when shifting of the automatic transmission occurs during the transmission torque capacity control by that means, in a direction in which a change in the rotation trajectory will occur corresponding to that shift.

In the starting clutch control device for an automatic transmission according to one or more embodiments of the present invention, when a shift of the automatic transmission occurs while executing the rotation trajectory control via the transmission torque capacity control of the starting clutch, the rotation trajectory is caused to be changed in a direction corresponding to the shift. Thus, it is possible to recognize or perceive that shift continuously through the change in the rotation trajectory. Therefore, it is possible to avoid the discomfort in a situation in which no feel of shifting remains perceived by the driver.

BRIEF DESCRIPTION OF THE DRAWINGS

FIGS. 2A-2B are logic diagrams showing a relationship between an engagement of a clutch and a gear position or change speed to be established in the twin-clutch manual transmission of FIG. 1 as well as the types of pre-shift occurring with a switchover operation of shift stage or gear position, wherein FIG. 2A shows a logic diagram of upshift, while FIG. 2B shows a logic diagram for downshift;

DETAILED DESCRIPTION

Below, description will be given of embodiments of the present invention with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
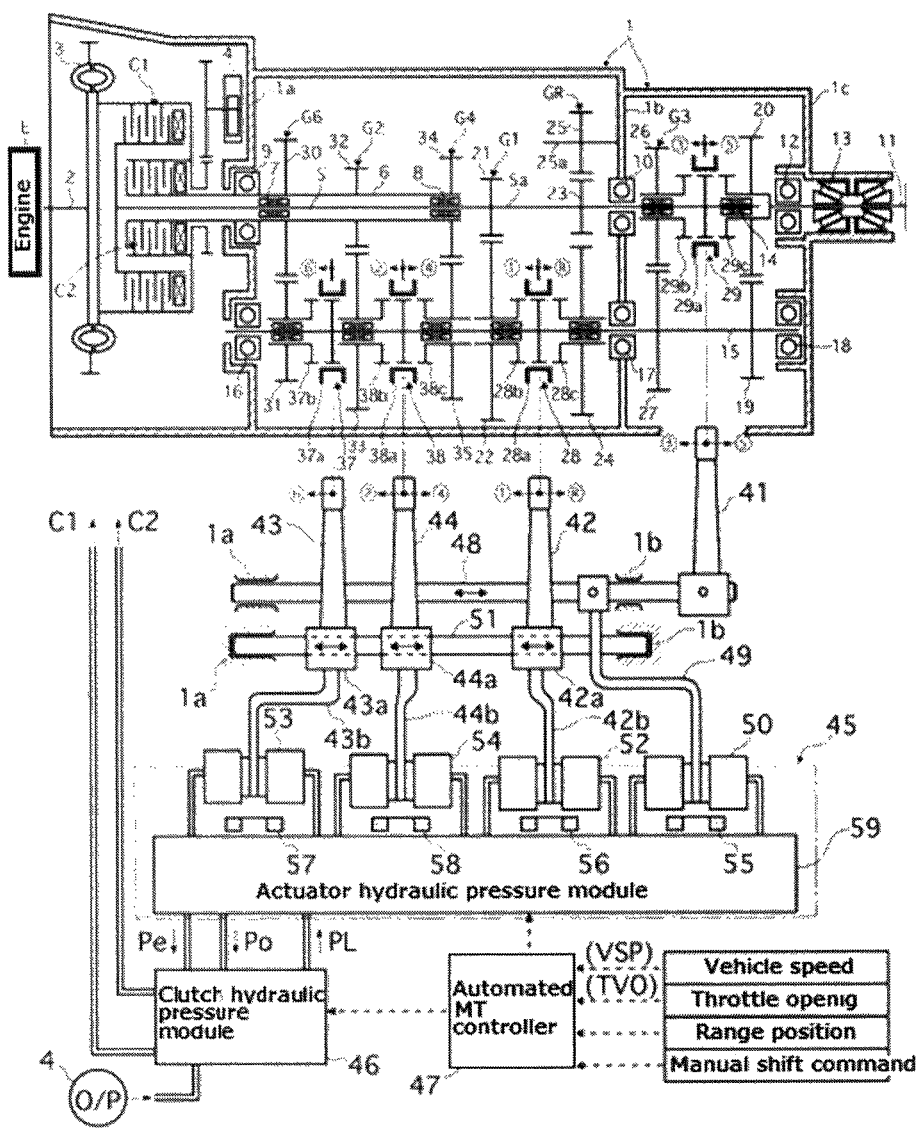
FIG. 1 is a schematic system diagram showing a twin-clutch automated manual transmission provided with a starting clutch control device according to one or more embodiments of the present invention along with its shift control system.

FIG. 1 is a schematic system diagram showing a twin-clutch automated manual transmission provided with a starting clutch control device according to one or more embodiments of the present invention along with its shift control system. The twin-clutch automated manual transmission in one or more embodiments of the present invention is constructed by housing the following shift gear train to a transmission case 1.

A torsional damper 3 is housed inside the front end (left end in FIG. 1) of the transmission case 1. The torsional damper 3 is intended to transmit an engine rotation inputted from an output shaft (crankshaft) 2 of the engine E (power source) to a first clutch C1 for odd-numbered gear shift stage (first speed or gear, third speed or gear, fifth speed or gear, and reverse gear) and to a second clutch C2 for even-numbered gear shift stage (second speed or gear, fourth speed or gear, sixth speed or gear) under buffer. Each of the first clutch CL1 for odd-numbered gear shift stages and the second clutch C2 for the even-numbered gear shift stages serves to operate as a starting clutch and is configured by an automatic wet rotary clutch which can control the transmission torque capacity (engaging force) automatically.

Further, inside the front end of the transmission case 1, an oil pump 4 is accommodated for discharging hydraulic oil used for shift control of the twin-clutch automated manual transmission. The oil pump 4 is also coupled to the engine crankshaft 2 through the torsional damper 3.

Thus, during operation of the engine E, the oil pump 4 is always driven and hydraulic oil is discharged for engagement and disengagement control and shift control of the first clutch C1 and second clutch C2, as will be described below.

Also, the transmission case 1 houses a first input shaft 5 for odd-numbered gear shift stages (first speed, third speed, fifth speed, and reverse), which extends from its front end to the rear end, and a second input shaft 6 for even-numbered gear shift stages (second speed, fourth speed, sixth speed), which extends from its frond end to an intermediate position thereof. The second input shaft 6 is formed hollow, and the first input shaft 5 is fitted into the hollow hole. With a front needle bearing 7 and a rear needle bearing 8 interposed between the first input shaft 5 and second input shaft 6, respectively, the first input shaft 5 and second input shaft 6 are coaxially rotatable relative to each other.

The front end of the first input shaft 5 and that of the second input shaft 6 are respectively coupled to the driven side of the first clutch CL1 and the driven side of the second clutch C2. The drive side of the first clutch C1 and the drive side of the second clutch C2 are respectively coupled to the engine crankshaft 2 through the torsional damper 3.

Thus, the first clutch C1, when engaged, introduces an engine rotation through the torsional damper 3 to the first input shaft 5, while the second clutch C2, when engaged, may introduce the engine rotation through the torsional damper 3 to the second input shaft 6.

The second input shaft 6 is rotatably supported by a ball bearing 9 relative to the front wall 1a of the transmission case 1. The first input shaft 5 is projected from the rear end of second input shaft 6, and a projecting rear end portion 5a of the first input shaft 5 is caused to penetrate an intermediate wall 1b of the transmission case 1, and is rotatably supported by a ball bearing 10 relative thereto.

A transmission output shaft 11 is disposed coaxially in the rear end portion 5a of the first input shaft 5. The transmission output shaft 11 is rotatably supported by a rear end wall 1c of the transmission case 1 by a tapered roller bearing 12 and an axial bearing 13 while being rotatably supported to the rear end 5a of the first input shaft 5 through a needle bearing 14. The transmission output shaft 11, although not shown, is coupled to left and right drive wheels via a propeller shaft or a differential gear device for transmitting shifting rotation from twin-clutch automated manual transmission to these wheels to propel the vehicle.

A counter shaft 15 is provided parallel to the first and second input shafts 5, 6, and to the transmission output shaft 11. The counter shaft 15 is rotatably supported through the roller bearings 16, 17, 18 by the front end wall 1a, intermediate wall 1b, and the rear end wall 1c of the transmission case 1, respectively.

A counter gear 19 is integrally provided in a rear end of the counter shaft 15, and an output gear 20 is provided on the output shaft 11. The counter gear 19 and the output gear 20 are intermeshed so that the counter shaft 15 is operatively coupled to the transmission output shaft 11 in order for the rotation to be transmitted under reduction in speed from the countershaft 15 to the transmission output shaft 11.

Between the rear end 5a of the first input shaft 5 and the counter shaft 15, a gear set of the odd-numbered gear shift stage group (first speed, third speed, and reverse) is disposed. More specifically, a first speed gear set G1, a reverse gear set GR, and a third speed gear set G3 are placed in order from the front side.

The first speed gear set G1 is configured to include a first speed input gear 21 provided at the rear end 5a of the first input shaft 5 and a first speed output gear 22 provided on the counter shaft 15 meshed therewith.

The reverse gear set GR is configured to include a reverse input gear 23 provided on the rear end 5a of the first input shaft 5, a reverse output gear 24 provided on the counter shaft 15, and a reverse idler gear 25 that meshes with both gears 23 and 24. Note that the reverse idler gear 25 is provided to be rotatably supported with respect to the reverse idler shaft 25a which is projected from the intermediate wall 1b of the transmission case 1.

The third speed gear set G3 is configured to include a third speed input gear 26 provided on the rear end portion 5a of the first input shaft 5 and a third speed output gear 27 provided on counter shaft 15 meshed therewith.

A 1-R synchromesh mechanism 28 is provided on the counter shaft 10 between the first output gear 14 and the reverse output gear 16. The 1-R synchromesh mechanism 21 is operated by shifting a coupling sleeve 28a leftward from a neutral position shown in the figure to be engaged with the clutch gear 28b to operatively couple the first speed output gear 22 with the counter shaft 15 to achieve a first gear speed or ratio. Further, the 1-R synchromesh mechanism 28 is operated by allowing the coupling sleeve 28a to shift rightward from the neutral position shown in the figure to be engaged with the clutch gear 28c to operatively couple the reverse output gear 24 with the counter shaft 15 to achieve a reverse speed or gear.

Also, a 3-5 synchromesh mechanism 29 is provided on the rearward end portion 5a of the first input shaft 5 between the third speed gear set G3 and the output gear 20. Further, when a coupling sleeve 29a of the 3-5 synchromesh mechanism 29 is allowed to be shifted leftward from the neutral position shown to engage with the clutch gear 29b, the third speed input gear 26 is operatively coupled to the first input shaft 5 to thereby achieve a third speed or gear. Further, when the coupling sleeve 29a of the 3-5 synchromesh mechanism 29 is allowed to be shifted rightward from the neutral position shown to engage with the clutch gear 29c, the first input shaft 5 is directly coupled to the output gear 20 to thereby achieve a fifth speed.

The gear sets of the even numbered gear shift stage groups (second speed, fourth speed and sixth speed) are arranged between the second input shaft 6 and the counter shaft 15 in the order of the sixth speed gear set G6, the second speed gear set G2, and the fourth speed gear set G4 from a front side.

The sixth speed gear set G6 is configured to include a sixth speed input gear 30 provided on the second input shaft 6 and a sixth speed output gear 31 provided on the counter shaft 15 meshed therewith.

The second speed gear set G2 is configured to include a second speed input gear 32 provided on the second input shaft 6 and the second speed output gear 33 provided on the counter shaft 15 meshed therewith.

The fourth speed gear set G4 is configured to include a fourth speed input gear 34 provided on the second input shaft 6 and a fourth speed output gear 35 provided on the counter shaft 15 meshed with each other.

On the counter shaft 15 on the side of the sixth speed gear set G6, a 6-N synchromesh mechanism 37 is provided. Thus, when a coupling sleeve 37a of the 6-N synchromesh mechanism 37 is allowed to shift in the left direction from the neutral position shown to engage with the clutch gear 37b, the sixth speed output gear 31 is operatively coupled to the counter shaft 15 to realize the sixth speed or gear.

On the counter shaft 15 in between the second speed gear set G2 and the fourth speed gear set G4, a 2-4 synchromesh mechanism 38 is provided.

Thus, when a coupling sleeve 38a of the 2-4 synchromesh mechanism 38 is operated to shift leftward from the neutral position shown to engage the clutch gear 38b, the second speed output gear 38 is drivingly connected to the counter shaft 15 to realize the second speed. Also, when the coupling sleeve 38a of the 2-4 synchromesh mechanism 38 is operated to shift rightward from the neutral position shown to engage the clutch gear 38c, the fourth speed output gear 35 is drivingly connected to the countershaft 15 to thereby achieve a fourth speed.

<Shifting Operation>

Now, description is given of a shifting operation performed by the twin clutch automated manual transmission configured as above.

(Non-Driving Range)

In non-driving ranges such as a neutral range (N range) or parking range (P range) in which no power transmission is requested, both automatic wet type rotary clutches C1, C2 are set in the non-control state and released. Further, the coupling sleeves 28a, 29a, 37a, and 38a of the respectively associated synchromesh mechanisms 28, 29, 37, and 38 are set in the neutral position shown in the figure. Thus, the twin clutch automated manual transmission will be placed in the neutral state in which no power transmission takes place.

(Driving Range)

In driving ranges such as a D range requiring an forward power transmission or a R range requiring a reverse power transmission, each of the forward gear position and the reverse gear position may be established by controlling the coupling sleeves 28a, 29a, 37a and 38a of the synchromesh mechanisms 28,29, 37 and 38, and the wet rotary clutches C1 and C2 using the hydraulic oil from the oil pump 9 as a medium, as described below.

(Forward Driving Range)

Figure 2A:
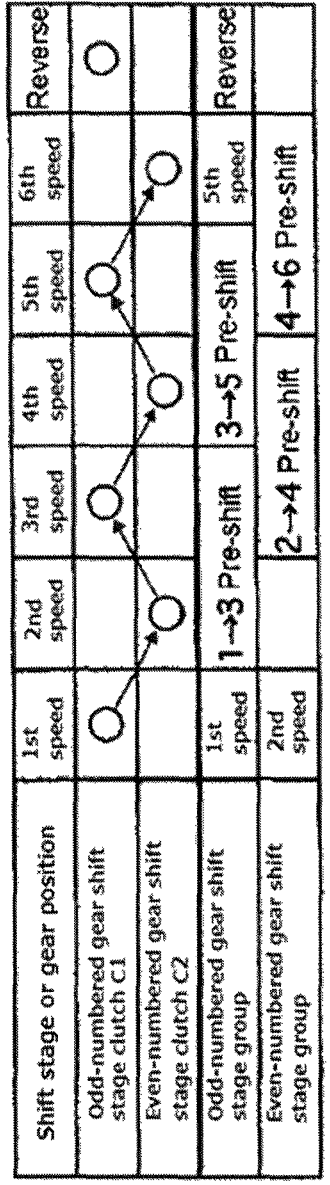

When the driver selects from the non-driving ranges such as the neutral range (N range) or parking range (P range) to the forward driving range such as the D range, the wet rotary clutches C1 and C2, which have been disengaged in the non-driving ranges, remain in the disengaged state. In this state, a first speed pre-shift and a second speed pre-shift as indicated in Section "shift stage=first speed" in FIG. 2A are executed as described below.

That is, by moving the coupling sleeve 28*a* of the synchromesh mechanism 28 leftward from the neutral position shown in the figure, the synchromesh mechanism 28 executes the meshing operation in which the gear 22 is operatively coupled to the counter shaft 15 to perform a pre-shift to the first speed in the odd-numbered gear shift stage group. Further, by moving the coupling sleeve 38*a* of the synchromesh mechanism 38 leftward from the neutral position shown in the figure, the gear 33 will be drivingly coupled to the counter shaft 15 under the rotation synchronization operation to carry out a pre-shift to the second speed in the even-numbered gear shift stage group.

However, even when the select operation is performed from the non-driving range such as the neutral range (N range) or the park range (P range), as long as the driver does not carry out a starting operation such as depressing on an accelerator pedal and the like, the automatic wet rotary clutches C1, C2 are maintained in the released state. Therefore, even when performing pre-shifting to the first speed and pre-shifting to the second speed described above, the rotation of the engine E is not transmitted through the first speed transmission gear train or the second speed transmission gear train to the output shaft 11 so that the vehicle may maintain the stopping state.

(Forward First Speed)

When the driver executes the starting operation such as depressing on the accelerator, as indicated by "○" in Section "shift stage=first speed" in FIG. 2A, the automatic wet rotary clutch C1 which is associated with the first speed corresponding to the starting shift stage or gear position in the forward driving range out of the automatic wet rotary clutches C1 and C2 in the released state will be engaged. Thus, the engine rotation from the clutch C1 is output through the first input shaft 5; the first speed gear set G1, the counter shaft 15, and the output gear sets 19, 20 to the output shaft 11 in the axial direction to transfer the power at the first speed. Apparently, it is also acceptable to perform the forward starting by controlling a progressive engagement (slip engagement) for that purpose to achieve a smooth start without starting shock.

(1→2 Shift)

When an upshift operation from the first speed to the second speed is executed, as indicated by an arrow from Section "shift stage=first speed" to "shift stage=second speed" in FIG. 2A, the clutch C1 in the engaged state is released or disengaged and the clutch C2 will be engaged. By a clutch changeover slip control, along with the pre-shifting to the second speed which has taken place prior to the selecting operation from the non-driving range to the forward driving range, switching from the first speed transmission gear train to the second speed transmission gear train, i.e., upshifting from the first speed to the second speed is performed. This makes it possible that the engine rotation from the clutch C2 is output through the second input shaft 6, second speed gear set G2, the counter shaft 15, and the output gear sets 19, 20 to the output shaft 11 in the axial direction to realize a power transmission at the second speed or gear.

Incidentally, while the second speed as described above is being achieved under the condition that the clutch C1 is released, a 1-3 pre-shift operation indicated in the columns in FIG. 2A "shift stage=second speed", "shift stage=third speed" is performed as described below. That is, by returning the coupling sleeve 28*a* of the synchromesh mechanism 28 to the neutral position, the synchromesh mechanism 28 performs a releasing operation to separate the gear 22 from the counter shaft 15 to thereby release the first speed pre-shift executed in the odd-numbered gear shift stage group. Further, by moving the coupling sleeve 29*a* of the synchromesh mechanism 29 leftward from the neutral position, the synchromesh mechanism 29 performs a meshing operation to operatively couple the gear 26 to the first input gear 5 under the rotation synchronization. Thus, by performing pre-shifting to the third speed within the same odd-numbered gear shift stage group 2, the 1 to 3 pre-shift will be achieved.

(2→3 Shift)

When upshifting from the second speed or gear to the third speed or gear is executed, as shown by an arrow directed from column "shift stage=second speed" to "shift stage=third speed" in FIG. 2A, by releasing the clutch C2 which is being in engaged condition while engaging the clutch C1 (i.e., by clutch switching slip control), along with the 1→3 pre-shift performed as described above during the second speed being in place, switching from the second speed transmission gear train to the third speed transmission gear train, i.e., upshifting from the second speed to the third speed will be performed. This makes it possible that the engine rotation from the clutch C1 is output through the first input shaft 5, the third speed gear set G3, the counter shaft 15 and the output gear sets 19, 20 to the output shaft 11 in the axial direction thereof. Therefore, it is possible to perform power transmission at the third speed.

Incidentally, while the third speed is being achieved as described above under the condition that the clutch C2 is released, a 2-4 pre-shift operation indicated in the columns in FIG. 2A "shift stage=third speed", "shift stage=fourth speed" is performed as described below. That is, by returning the coupling sleeve 38*a* of the synchromesh mechanism 38 to the neutral position, the synchronous meshing mechanism 38 performs a dislocating operation to separate the gear 33 from the counter shaft 15. Further, by moving the coupling sleeve 38*a* of the synchromesh mechanism 38 rightward from the neutral position, the gear 35 is drivingly coupled to the counter shaft 35, to thereby carrying out pre-shifting to the fourth speed among the odd-numbered gear shift stage group so that the 2→4 pre-shift is performed.

(3→4 Shift)

When upshifting from the third speed or gear to the fourth speed or gear is executed, as shown in FIG. 2A by an arrow directed from column "shift stage=third speed" to "shift stage=fourth speed", by releasing the clutch C1 which is being in engaged condition while engaging the clutch C2 in released state (i.e., by clutch switching slip control), along with the 2→4 pre-shift performed as described above during the third speed being in place, switching from the third transmission gear train to the fourth speed transmission gear train, i.e., upshifting from the third speed to the fourth speed will be performed. This makes it possible that the engine rotation from the clutch C2 is output through the second input shaft 6, the fourth speed gear set G4, the counter shaft 15 and the output gear sets 19, 20 to the output shaft 11 in the axial direction thereof. Therefore, it is possible to perform power transmission at the fourth speed.

Incidentally, while the fourth speed is being achieved as described above under the condition that the clutch C1 is released, a 3-5 pre-shift operation indicated in the columns in FIG. 2A "shift stage=fourth speed", "shift stage=fifth speed" is performed as described below. That is, by returning the coupling sleeve 29a of the synchromesh mechanism 29 to the neutral position, the synchronous meshing mechanism 29 performs a dislocating operation to separate the gear 26 from the input shaft 5, so that the third speed pre-shifting that has been taken place among the odd-numbered gear shift stage is released. Further, by moving the coupling sleeve 29a of the synchromesh mechanism 29 rightward from the neutral position, such a mushing operation to directly coupling the first input shaft 5 to the output shaft 11 under rotation synchronous operation to thereby perform pre-shifting to the fifth speed among the odd-numbered gear shift stage group so that the 3→5 pre-shift is performed.

(4→5 shift)

When upshifting from the fourth speed or gear to the fifth speed or gear is executed, as shown in FIG. 2A by an arrow directed from column "shift stage=fourth speed" to "shift stage=fifth speed", by releasing the clutch C2 which is being in engaged condition while engaging the clutch C1 in released state (i.e., by clutch switching slip control), along with the 3→5 pre-shift performed as described above during the fourth speed being in place, switching from the fourth transmission gear train to the fifth speed transmission gear train, i.e., upshifting from the fourth speed to the fifth speed will be performed. This makes it possible that the engine rotation from the clutch C1 is output through the first input shaft 5, and the coupling sleeve 29a to the output shaft 11 in the axial direction thereof. Therefore, it is possible to perform power transmission at the fifth speed (change speed ratio 1:1).

Incidentally, while the fifth speed is being achieved as described above under the condition that the clutch C2 is released, a 4-6 pre-shift operation indicated in the columns in FIG. 2A "shift stage=fifth speed", "shift stage=sixth speed" is performed as described below. That is, by returning the coupling sleeve 38a of the synchromesh mechanism 38 to the neutral position, the synchronous meshing mechanism 38 performs a dislocating operation to separate the gear 35 from the counter shaft 15, so that the fourth speed pre-shifting that has been taken place among the even-numbered gear shift stage is released. Further, by moving the coupling sleeve 37a of the synchromesh mechanism 37 leftward from the neutral position, such a mushing operation to drivingly couple the gear 31 to the counter shaft 15 to thereby perform pre-shifting to the sixth speed among the even-numbered gear shift stage group so that the 4→6 pre-shift is performed.

When upshifting from the fifth speed or gear to the sixth speed or gear, as shown in FIG. 2A by an arrow directed from column "shift stage=fifth speed" to "shift stage=sixth speed", by releasing the clutch C1 which is being in engaged condition while engaging the clutch C2 in released state (i.e., by clutch switching slip control), along with the 4→6 pre-shift performed as described above during the fifth speed being in place, switching from the fifth transmission gear train to the sixth speed transmission gear train, i.e., upshifting from the fifth speed to the sixth speed will be performed. This makes it possible that the engine rotation from the clutch C2 is output through the second input shaft 5, the sixth speed gear train G6, the counter shaft 15, and the output gear sets 19, 20 to the output shaft 11 in the axial direction thereof. Therefore, it is possible to perform power transmission at the sixth speed.

As described above, while the sixth speed as described above is realized, with the 3→5 pre-shift state which has taken place as described above being maintained during the fourth speed being in place, the 5-speed pre-shift state is maintained as shown in FIG. 2A in column "shift stage=sixth speed".

(Downshift)

Even when a downshift is sequentially executed from the sixth speed or gear to the first speed or gear, a control in a direction opposite to the upshifting described above is executed. Thus, as shown in FIG. 2B, by allowing to preform a pre-shift sequence in a direction opposite to the pre-shift sequence described above, and engaging and disengaging control of the clutches C1 and C2, a predetermined sequential downshift may be executed.

Figure 2B:
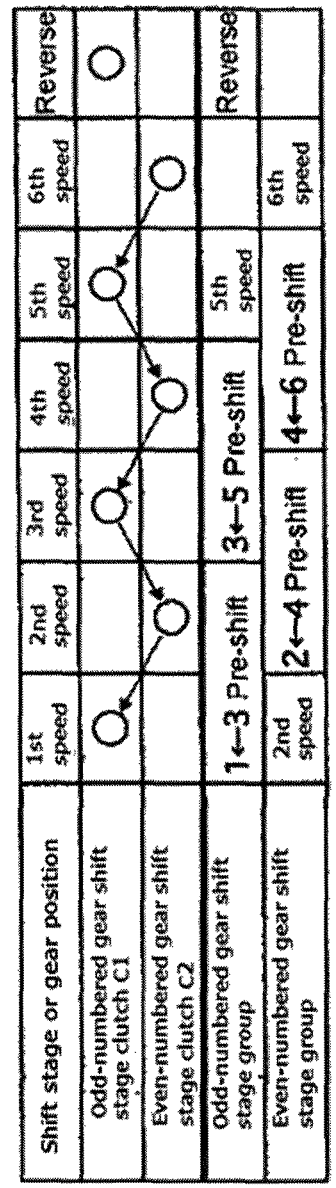

When the vehicle is finally stopped via the sequential downshift processes, while the second speed is being realized, as shown in FIG. 2B, in column "shift stage=second speed", and "shift stage=first speed", pre-shifting to the first speed (forward starting shift stage in D range) from the third speed among the odd-numbered gear shift stage group. Further, when a vehicle speed decelerates to become a lower vehicle speed which requires downshift from the second speed, by releasing the clutch C2 with the clutch C1 engaged (by clutch switching slop control), down-shifting to the first speed is performed. The vehicle may be stopped by disengaging the wet rotary clutch C1 when the vehicle further decelerates and the vehicle speed approaches an immediate stop.

Then, when the D range D (forward driving range) is switched to the non-driving range such as the neutral range (N range), or parking range (P range), in addition to the disengagement of both of the wet rotary clutches C1 and C2, the coupling sleeves 28a, 29a, 37a and 38a of the synchromesh mechanism 28, 29, 37, 38 are moved to or maintained in the neutral positions. As such, the twin-clutch automated manual transmission enters a neutral state in which the power transfer is not executed.

(Reverse Gear Stage)

When the non-driving range is switched over to the range R in order to allow driving in the reverse direction, the synchromesh mechanism 28 executes the meshing operation to operatively couple the gear 24 to the counter shaft 15 under a rotation synchronization operation by moving the coupling sleeve 28a of the synchromesh mechanism 28 rightward. Thus, as shown in FIGS. 2A, 2B, in "shift stage=reverse", pre-shifting to a reverse speed stage (reverse starting shift stage) within odd-numbered gear shift stage group is performed.

Even when the non-driving range such as the neutral range (N range) or parking range (P range) is switched to the reverse driving range such as R range, the wet rotary clutches C1 and C2 remain disengaged despite the pre-shift to the reverse speed position (reverse starting shift stage) is executed, as long as the driver does not performs a starting operation such as depression on an accelerator pedal, and the like. Thus, despite pre-shifting to the reverse shift stage described above, rotation of the engine E will not be transmitted to the output shaft 11 via the reverse transmission gear train so that the vehicle stopping condition may be maintained.

When the driver performs a starting operation such as stepping on the accelerator and the like at this stage, as shown by marking "0" in "shift stage=reverse", among the automatic wet rotation clutches C1, C2, which have been in a released state", the automatic wet rotary clutch C1 is allowed to be engaged, which relates to a reverse shift stage corresponding to the starting shift speed stage in the revers shift stage. Thus, the engine rotation from the clutch C1 is output through the first input shaft 5, reverse gear set GR, the counter shaft 15, and the output gear sets 19, 20 to the output haft 11 in the axial direction thereof. At this instance, because the reverse gear set GR is reversed in the rotation direction, power transmission in the reverse shift stage may be performed. Note that, when starting, a smooth reverse starting may be performed without causing start shock by performing a progressive engagement of the clutch C1 (slip engagement).

<Transmission Control System>

Description is now given below of the twin-clutch automated manual transmission shift control system which governs the engagement/release control of the clutches C1, C2 and shift operation of the synchromesh mechanisms 28, 29, 37, and 38 with reference to FIG. 1. The synchronization control system which controls the shift operation of meshing mechanisms 28, 29, 37, 38 includes:

a 3-5 shift fork 41 engaged with the outer groove of the coupling sleeve 29a to perform shifting,
a 1-R shift fork 42 engaged with the outer groove of the coupling sleeve 28a to perform shifting,
a 6-N shift fork 43 engaged with the outer groove of the coupling sleeve 37a to perform shifting, and
a 2-4 shift fork 44 engaged with the outer groove of the coupling sleeve 38a to perform shifting. Further, an actuator unit 45 is provided for making the stroke of the shift forks 41 to 44 for shift operation.

As a control system which controls the engagement and disengagement operation of the first clutch C1 and second clutch C2, a clutch hydraulic pressure module 46 is provided to perform engagement and disengagement control of first clutch C1 and the second clutch C2 by a clutch control pressure from the clutch hydraulic module 46. The clutch hydraulic module 46 and the actuator unit 45 (i.e. actuator hydraulic module 59) are respectively controlled by a common automated MT controller 47.

The 3-5 shift fork 41 is fixed to the first shift rod 48 for performing the shift operation described above by the longitudinal stroke of the first shift rod 48. Therefore, the first shift rod 48 is supported by the front end wall 1a and the intermediate wall 1b of the transmission case 1 to be movable in the axial direction. The 3-5 shift bracket 49 is fixed to the first shift rod 48, and the end of the 3-5 shift bracket 49 is loosely fitted to be support by a spool connecting shaft portion of the 3-5 shift actuator 50. In other words, the 3-5 shift fork 41 is shifting operated either leftward (when achieving a third speed) or rightward (when achieving fifth speed) from the neutral position shown in the figure according to the spool operation of the 3-5 shift actuator 50.

The 1-R shift fork 42 is provided to make the stroke in the axial direction relative to the second shift rod 51. The second shift rod 51 is mounted with respect to the front end wall 1a and the intermediate wall 1b of the transmission case 1 so as to be stationary in the axial direction. Further, the end of a bracket arm portion which is integrally formed with a cylindrical portion 42a of the 1-R shift fork 42 is freely supported by a spool connecting portion of the 1-R shift actuator 52. In other words, the 1-R shift fork 42 is shift operated either leftward (when achieving first speed) or rightward (when achieving reverse speed) from the neutral position shown according to the spool operation of the 1-R shift actuator 52.

The 6-N shift fork 43 is mounted so as to be able to make a stroke in the axial direction relative to the second shift rod 51 which is axially fixed to the transmission case 1. Further, the end of the bracket arm portion 43b integrally formed with the bracket cylindrical portion 43a of the 6-N shift fork 43 is freely supported by a spool connecting portion of the 6-N shift actuator 53. In other words, the 6-N shift fork 43 is shift operated leftward (when achieving the sixth speed) from the neutral position shown, in accordance with the spool operation of the 6-N shift actuator 53.

The 2-4 shift fork 44 is mounted so as to be able to make a stroke in the axial direction relative to the second shift rod 51 which is axially fixed to the transmission case 1. Further, the end of the bracket arm portion 44b integrally formed with the bracket cylindrical portion 44a of the 2-4 shift fork 44 is freely supported by a spool connecting portion of the 2-4 shift actuator 53. In other words, the 2-4 shift fork 44 is shift operated leftward (when achieving second speed) or rightward (when achieving fourth speed) from the neutral position shown, in accordance with the spool operation of the 2-4 shift actuator 54.

The actuator unit 45 is fixed to a lower position, an upper position, a side position and the like of the transmission case 1. The actuator unit 45 includes a 3-5 shift actuator 50, a 1-R shift actuator 52, a 6-N shift actuator 53, and a 2-4 shift actuator 54, integrally. Further, the unit 45 is integrally provided with a 3-5 and shift stage sensor 55 of the actuator 50, a 1-R shift stage sensor 56 of the actuator 52, a 6-N shift stage sensor 57 of the actuator 53, a 2-4 shift stage sensor 58 of the actuator 54, and an actuator hydraulic module 59.

The actuator hydraulic module 59 creates an even-shift-stage pressure Pe and an odd-shift-stage pressure Po respectively by using the line pressure PL as a source pressure to the line pressure PL which is regulated in pressure by the clutch hydraulic module 46, the actuator hydraulic module 59 is intended to supply an actuator operating pressure to shift pressure conduits to the shift actuators 50, 52, 53, and 54 corresponding to the achieved shift stage.

The clutch hydraulic module 46 receives the discharge hydraulic oil from the oil pump 4 which is driven by the engine as described above, and regulates to a predetermined line pressure PL Further, based on the even-numbered gear shift stage pressure Pe from the actuator hydraulic module 59 describe above, a clutch control pressure to the second clutch C2 for even-numbered gear shift stage is created, while, based on the odd-numbered gear shift stage pressure P0, a clutch control pressure to the first clutch C1 for odd-numbered gear shift stage is created.

The automated MT controller 47 outputs to each of the solenoid of the actuator hydraulic pressure module 59 a control command for achieving shift stage. In addition, the automated MT controller 47 is intended to output a clutch engaging control command (including line pressure control command) to each solenoid of the clutch hydraulic pressure module 46.

Therefore the automated MT controller 47 receives:
a signal from a vehicle speed sensor for detecting a vehicle speed VSP,
a signal from a throttle opening sensor for detecting the opening (throttle opening) TVO of a throttle valve (not shown) which governs output control of the engine E,
a signal from a range position sensor for detected a selected range of the automated manual transmission manually commanded in accordance with the desired driving mode (P range for parking, R range for reverse travelling, N range for stopping, D range for forward automatic transmission, M range for manual transmission, etc.), and a signal from the manual transmission command unit for producing a manual shift command (manual upshift command, manual downshift command) in response to manual operation of the driver in a direction perpendicular to the range select lever.

The automated MT controller 47, in response to a predetermined calculation based on the input information, outputs to the solenoid of the actuator hydraulic pressure module 59 a shift stage achieving control command and to the solenoid of the clutch hydraulic pressure module 46 a clutch engaging control command (including the line pressure control command).

<Transmission Torque Capacity Control of Starting Clutch>

Now, a description is given of the transmission torque capacity control of the first and second clutches C1, C2 representing a starting clutch of the twin clutch automated manual transmission. The transmission torque capacity control is performed by executing the control program in FIG. 3 by the automated MT controller 47 illustrated in FIG. 1.

Figure 3:
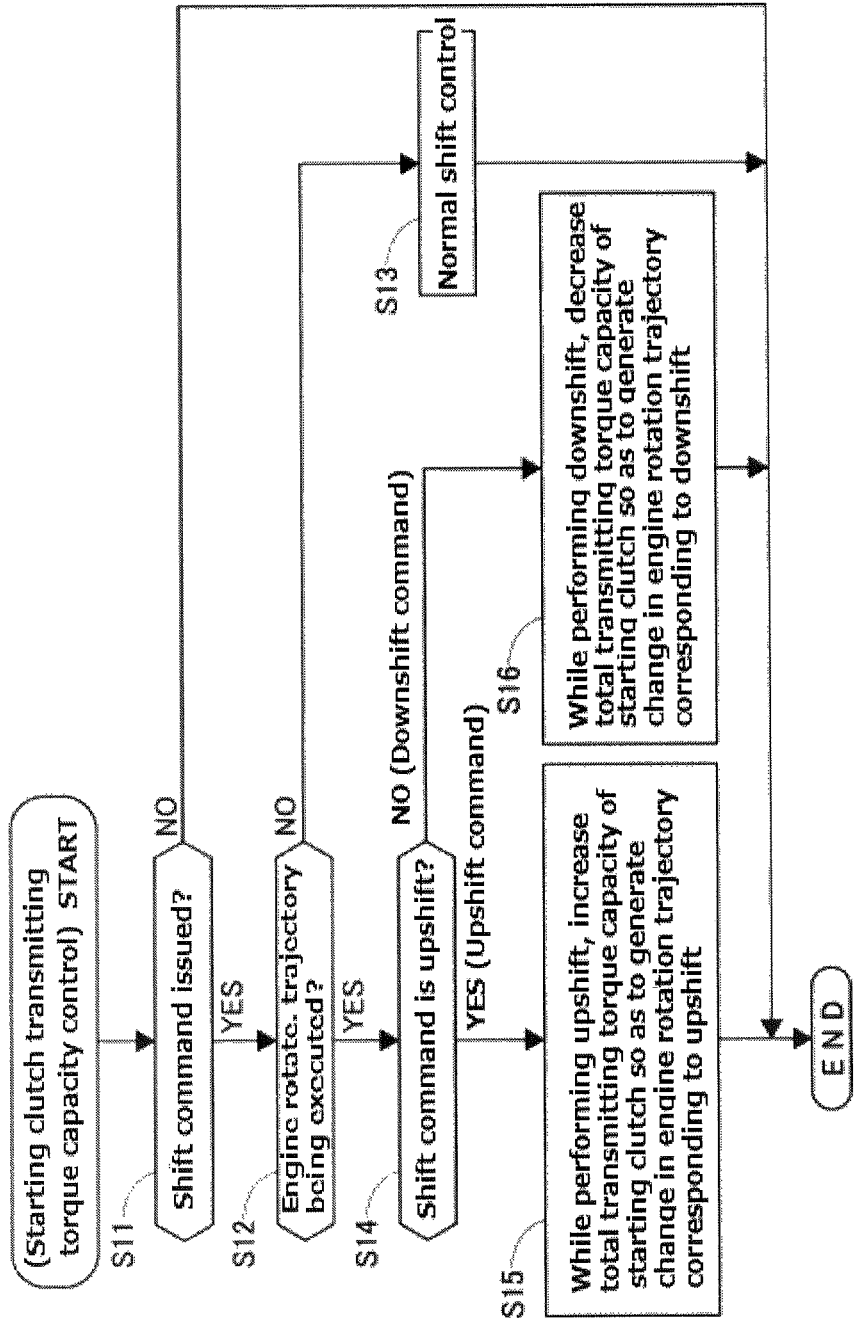
FIG. 3 is a flowchart indicating the content related to the shift control and the starting clutch control executed by an automated MT controller for the twin clutch-type automated manual transmission illustrated in FIG. 1.

In step S11 in FIG. 3, it is checked whether or not a shift command (including a manual shift command) is issued from the automated MT controller 47 to a twin clutch type automated manual transmission in FIG. 1, and, if the shift command is issued, in the next step S12, it is checked whether or not the engine rotation trajectory control is being executed via the transmission torque capacity control of the clutches C1, C2.

As describe above, since one or more embodiments of the present invention addresses the shifting during the engine trajectory control, when determination of no shift command is made in step S11, control ends. Also, even when determination of shift command is made out in step S11, when it is determined that the engine rotation trajectory control is not in place, in step S13, the shift command is realized by a normal shift control in which the pre-shift of the above described transmission system or path and the engaging/releasing (changeover) of the clutches C1, C2.

When it is determined in step S11 and step S12 that a shift command has issued while the engine rotation trajectory control is in place, as described above, the engine rotation trajectory will be controlled to a desired rotation trajectory so that no start shock or start delay would occur. Thus, such an engine rotation trajectory control is performed, i.e., without change accompanied by the shift. Therefore, the driver is unable to recognize or perceive the shift from change in engine rotation and thus feels discomfort. In order to solve this program, control proceeds to steps S14 to S16.

In step S14, it is determined whether the shift command which has been determined in step S11 is the upshift command or the downshift command. When it is determined in step S14 that the shift command is the downshift command, control proceeds to step S15, while when the upshift command is determined, control proceeds to step S16, to selectively perform upshifting or downshifting to meet the shift command. In addition, in order to perform the transmission torque capacity control on the clutches C1, C2 to resolve the discomfort described above, the following will be carried out. Thus, the steps S15 and S16 correspond to a starting clutch control means according to one or more embodiments of the present invention.

In step S15 to be selected when the shift command is an upshift, in addition to performing the upshift, the total transmission torque capacity of the clutches C1, C2 is caused to increase so as to generate change in engine rotation trajectory (change in a rotation decreasing direction) corresponding to the upshift. In step S16 to be selected when the shift command is a downshift, while performing the downshift, the total transmission torque capacity of the clutches C1, C2 is caused to decrease so as to generate change in engine rotation trajectory (change in a rotation increasing direction) corresponding to the downshift.

(Upshift Clutch Transmission Torque Capacity Control)

In step S15, the transmission torque capacity control of the clutches C1, C2, which is to be executed due to occurrence of an upshift command during the engine rotation trajectory control will be detailed based on first to third upshift control examples below. It is presumed as a driving scene that the vehicle is stopped in D range in a state in which a first speed pre-shift and second speed pre-shift have been completed with the first clutch C1 is slip engaged for generating a creep torque while the second clutch C2 released. From this state, is further assumed that, in response to a vehicle starting operation by stepping on an accelerator pedal, starting in the first speed is performed while the first clutch C1 gradually increases the transmission torque capacity for the engine rotation projector control, and an 1→2 upshift command from the first speed to the second speed occurs during the engine rotation trajectory control.

(A) First Upshift Control Example (Changeover Preceding Type, Part I)

Figure 4:
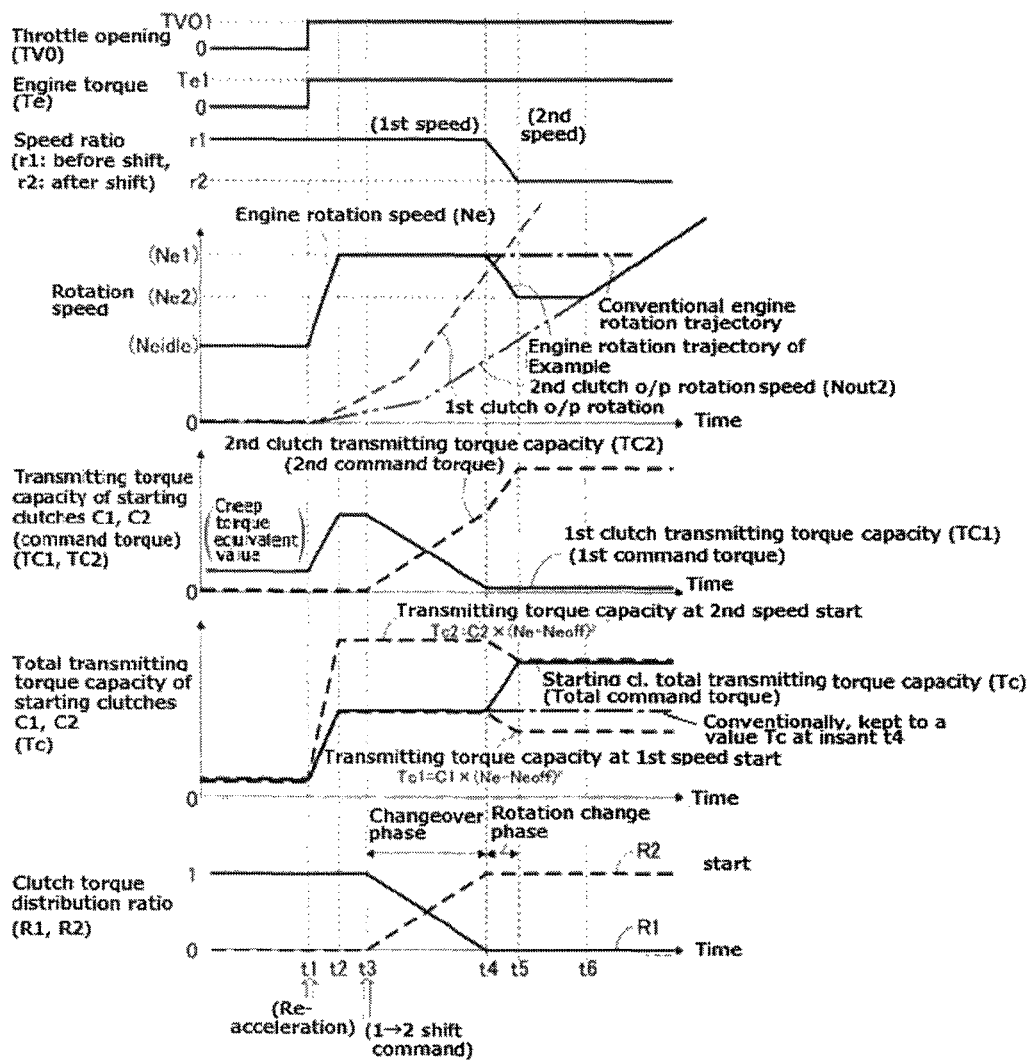
FIG. 4 is an operation time chart showing a first example of the upshift control by the control program shown in FIG. 3.

FIG. 4 illustrates a first example for upshift control (Changeover preceding type, Part 1) in which the changeover from the first clutch C1 to the second clutch C2, which is to take place when performing 1→2 upshift control, is performed in advance, and the total transmission torque capacity of the starting clutches C1, C2 is subsequently controlled to generate the engine rotation trajectory change corresponding to the 1→2 upshift.

When the accelerator pedal is depressed at instant t1 in the vehicle stopping state and the throttle opening TVO increases from 0 to TVO1, accompanied by this change, the engine torque Te is increased from 0 to Te1 so that the engine speed Ne increases as shown in the figure. From time t1 in accordance with the increase of such engine rotation speed Ne, the engine rotation trajectory representing the development of an engine rotation speed Ne over time is controlled so that the engine rotation trajectory matches a desired rotation trajectory.

When performing the engine rotation trajectory control, the sum of the transmitting torque capacities of the clutch C1 and the clutch C2, i.e. the total transmission torque capacity Tc (command value) is determined by calculation conforming to the equation (1) described above. Then, the transmission torque capacity TC1 (command value) of the first clutch C1 and the transmission torque capacity TC2 (command value) of the second clutch C2 are respectively obtained to obtained the total transmission torque capacity. Further, according to these transmitting torque capacities TC1, TC2, the clutches C1, C2 are controlled in the engaging force.

In determining the total transmission torque capacity Tc of the clutches C1, C2 for use in the engine rotational trajectory control, since the first speed or gear is in place at start time t1, the transmission torque capacity Tc1 at the first speed start time via the first clutch C1 is obtained according to the following equation analogue to the equation (1), and set as the total transmission torque capacity Tc.

$$Tc = Tc1 = C1 \times (Ne - Neoff)^2 \qquad (2)$$

Wherein,

C1: torque capacity coefficient of the first clutch C1
Ne: engine rotation speed
Neoff: engine rotation correction amount When using a torque distribution ratio R1 of the first clutch C1 and a torque distribution ratio R2 of the second clutch C2, along with the total transmission torque capacity Tc of these clutches C1, C2, the transmission torque capacity Tc1 of the first clutch C1 and the transmission torque capacity Tc2 of the second clutch C2 may be respectively expressed in the following equations.

$$Tc1 = R1 \times Tc \quad (3)$$

$$Tc2 = R2 \times Tc \quad (4)$$

At start time t1, as shown in FIG. 4, since the second clutch C2 is in released state, the torque distribution ratio of the first clutch C1 is "1" so that Tc1=Tc. Thus, according to the equation (2) above, the total transmission torque capacity Tc may be obtained. On the other hand, the torque distribution ratio R2 of the second clutch C2 is "0". Thus, the transmission torque capacity Tc2 of the second clutch C2 is also equal to "0".

Figure 5:
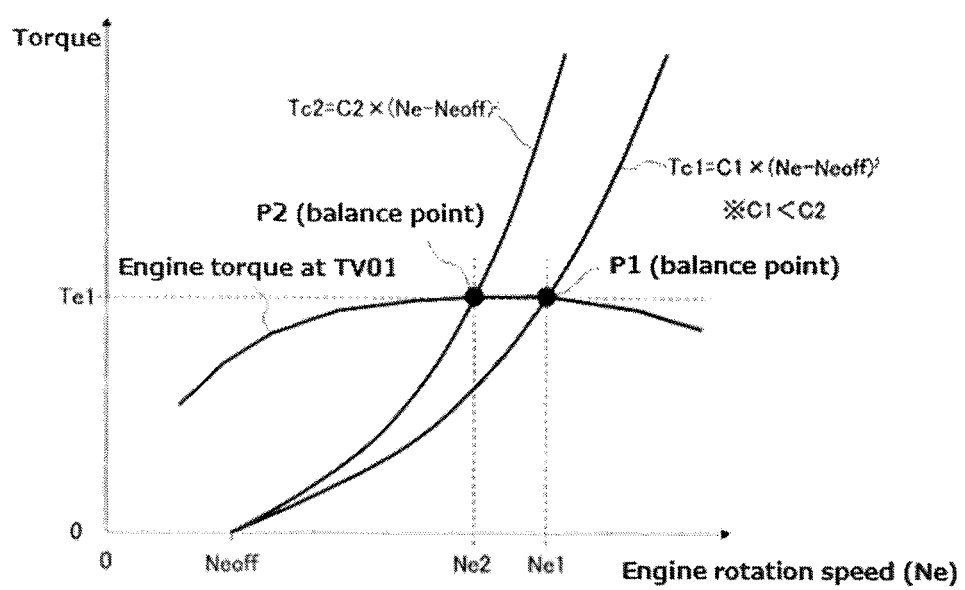
FIG. 5 is a characteristic diagram showing, with respect to engine rotation speed, an engine torque change characteristics at a specific throttle opening TVO1, and transmission torque capacity change characteristics at a first speed starting and a second speed starting through a first clutch and a second clutch.

In accordance with increase in the engine rotation speed Ne along a predetermined trajectory from the start time T1 by the engine rotation trajectory control via the transmission torque capacity control of the first clutch C1, i.e., along with increase in the transmission torque capacity TC1 of the first clutch C1, the total transmission torque capacity Tc will increase as shown in FIG. 4. Such increase in the total transmission torque capacity Tc (transmission torque capacity TC1) is generated to have a tendency as shown in FIG. 5 with respect to increase in the engine rotation speed Ne. When adding, in FIG. 5, an engine torque change with the throttle opening TVO=TVO1 (see FIG. 4), the intersection of these lines, P1 represents a balance point at which, during the start with the throttle opening TVO=TVO1, the engine torque Te and the total transmitting toque capacity Tc (transmission torque capacity TC1) are balanced.

During increase in the engine rotation speed Ne at and after the instant of vehicle start time t1, when the engine rotation speed Ne reaches Ne1 at the balance point in FIG. 5 as at the instant t2 in FIG. 4, the engine torque Te=Te1 balances with the total transmission torque capacity Tc (transmission torque capacity TC1) and, as apparent from the following equation, the engine rotation speed Ne stops to increase and is maintained at Ne=Ne1 as shown in and after the instant t2 in FIG. 4.

$$Ie \times d\omega e/dt = Te - Tc \quad (5)$$

Wherein,
Ie: rotation inertia of the engine
ωe: output shaft rotation angle velocity of the engine At instant t2 at which the total transmission torque capacity Tc (transmission torque capacity TC1) balances with the engine torque Te=Te1 and thereafter, the total transmission torque capacity Tc (transmission torque capacity TC1) is controlled as shown in FIG. 4 so that the engine rotation speed Ne will be substantially constant (at desired rotation trajectory), i.e., the balance point P1 in FIG. 5 will be maintained.

More specifically, when the engine rotation speed Ne becomes greater than the engine rotation speed Ne1 of the balance or equilibrium point P1, the total transmission torque capacity Tc (transmission torque capacity TC1) is caused to increase in order for the engine rotation speed Ne to decrease to Ne1. Conversely, when the engine speed Ne is smaller than Ne1, control is carried out for reducing the total transmission torque capacity Tc (transmission torque capacity TC1) so that the engine speed Ne is increased to Ne1through an engine rotation feedback control.

In other words, the total transmission torque capacity Tc (transmission torque capacity TC1) is controlled to allow the engine rotation speed Ne to converge to Ne1.

Incidentally, the aim to allow the engine rotation trajectory to a desired rotation trajectory (to maintain Ne equal to Ne1) as described above resides in prevention of the engine stall firstly, secure of the starting performance secondly, and prevention of engine racing, thirdly.

At instant t3 during the engine rotation trajectory control, when an 1→2 upshift command (shift command) is generated by an automatic shift or manual shift, control proceeds from step S11 in FIG. 3 through step S12 and step S14 to step S15. In step S15, shift control described below and the transmission torque capacity control according to one or more embodiments of the present invention will be performed.

First, during instants between t3 and t4, the changeover from the first clutch C1 to the second clutch C2 is performed in response to the 1→2 upshift command. The switchover control of the clutches C1, C2, is carried out, as shown in FIG. 4, by switching from a state in which TC1=Tc, TC2=0 at instant t3 to a state in which TC1=0, TC2=Tc. More specifically, the changeover control from C1 to C2 is carried out by causing the clutch torque distribution ratio R1 to decrease from "1" to "0" gradually, while linking to the decrease of R1 to increase the clutch torque distribution ration R2 from "0" to "1" gradually. Thus, power transmission path within the transmission is switched from the transmission path for the first speed to transmission path of the second speed.

From instant t4 that the changeover phase described above is terminated until instant t5, a rotation change phase is generated in which the change speed ratio transitions from the speed ratio r1 before shifting (first speed) to the speed ratio r2 after shifting (second speed). However, as in the conventional technique, if the above described engine rotation trajectory control would be continued after the instant t4 as well, the total transmission torque capacity Tc for the starting clutch would be maintained at the value at instant t4, as indicated by the dashed line. Consequently, the engine speed Ne will be kept at Ne1 as shown by the dashed line, and the engine rotation change corresponding to the 1→2 upshift does not occur.

Incidentally, the driver, especially when shifting the automatic transmission manually, drives the vehicle while perceiving shifting operation by a transmission input side rotation change (i.e. engine rotation change). Thus, without feeling a change in the engine rotation trajectory accompanied by the shifting of the automatic transmission as in the conventional one, the driver will have a feeling of strangeness.

Therefore, in the first upshift control example in FIG. 4, by controlling the transmission torque capacity of the clutches C1, C2 as described below from the time of changeover phase completion t4, the change in the engine rotation trajectory corresponding to the 1→2 upshift will be caused to occur.

This change in the engine rotation trajectory entails to increase the total transmission torque capacity Tc of the clutches C1, C2 so as to decrease the engine rotation speed Ne, since the type of shift is upshift. More specifically, first, a decision is made to which destination value (destination engine rotation speed) Ne2 the engine rotation is reduced. Since, after the upshift, the engine rotation trajectory control is performed at the second speed, Tc2 is obtained by the following equation analogous to the equation (1) described above.

$$Tc2 = C2 \times (Ne - \text{Neoff})^2 \quad (6)$$

Wherein,
C2: torque capacity coefficient of the second clutch C2 (C2>C1)
Ne: engine rotation speed
Neoff: engine rotation correction amount
The engine rotation speed Ne2 at which the transmission torque capacity Tc2 in the second speed start by the second clutch C2 with the change characteristic in FIG. 5 balances with the current engine torque Te1 is obtained from the engine rotation speed at the balance point P2 in FIG. 5, and the engine rotation speed Ne2 is defined as the target decreased engine rotation speed.

Then, determination is made of the total transmission torque capacity of the clutches C1, C2 required to achieve the target decreased engine speed Ne2.

The transmission torque capacity Tc2 at the second speed start, which is obtained by substituting the target decreased engine rotation speed Ne2 for the above described equation (6) indicating the transmission torque capacity Tc2 of the second speed start, will be set as the total transmission torque capacity Tc of the clutches C1, C2 required for achieving the target decreased engine rotation speed Ne2.

$$Tc = Tc2 = C2 \times (Ne2 - \text{Neoff})^2 \quad (7)$$

Subsequently, the total transmission torque capacity Tc of the clutches C1, C2 is caused to gradually increase from the instant t4 to the instant t5 from the Ne=Ne1 achieving value (transmission torque capacity Tc1 at first speed start) at instant t4 to the Ne=Ne2 achieving value (transmission torque capacity Tc2 at second speed start) at instant t5. In accordance with the increase of the total transmission torque capacity Tc from Tc1 to Tc2, during instant t4 to t5, the transmission torque capacity TC2 of the second clutch C2 will increase gradually as shown in the figure. As described, due to the gradual increase in the transmission torque capacity TC2 of the second clutch C2 during instant t4 and t5, the engine rotation speed Ne is gradually reduced from Ne1 to Ne2. Thus, the engine rotation trajectory may be changed in a decreasing direction in response to the 1→2 upshift during a rotation change phase between instants t4 and t5. Therefore, it is possible to avoid the discomfort described above.

On reaching the equilibrium or balance point P2 in FIG. 5 at the instant t5, the total transmission torque capacity Tc of the clutches C1, C2 will be balanced with the engine torque Te=Te1, and reduction of the engine speed Ne stops.

At the instant t5 and thereafter, in order for the engine speed Ne to be kept at Ne=Ne2, the total transmission torque of the clutches C1, C2 (transmission torque capacity TC2 of the second clutch C2) will be controlled. Then, at instant t6, at which the engine speed Ne (=Ne2) matches the second clutch output rotation speed Nout2, the second clutch C2 is placed in a completely engaged state to thereby terminate the shifting operation. Subsequently, when the vehicle speed VSP exceeds a predetermined vehicle speed above which the engine rotation trajectory control is impermissible, the engine rotation trajectory control ends.

(b) Second Upshift Control Example (Simultaneous Changeover & Rotation Change Type)

Figure 6:
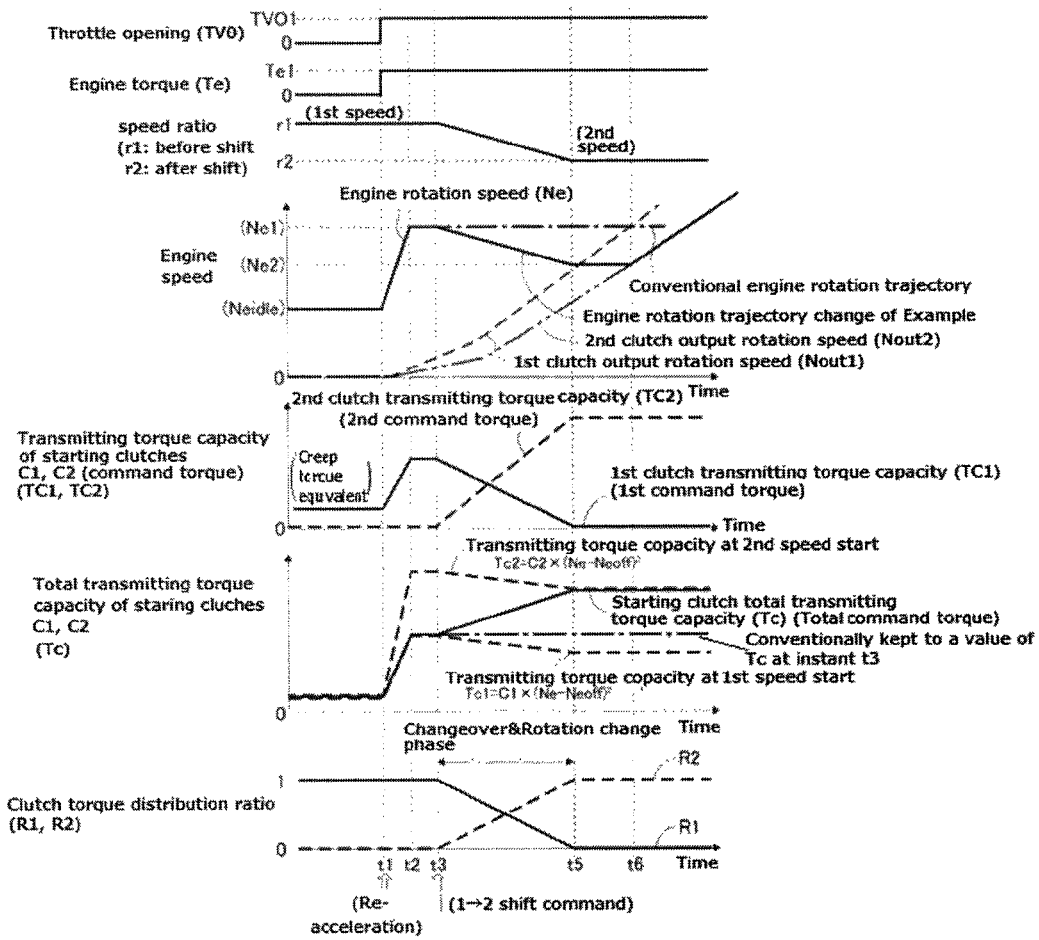
FIG. 6 is an operation time chart showing a second example of the upshift control by the control program shown in FIG. 3.

FIG. 6 shows a second example for upshift control (simultaneous changeover & rotation change type) in which, in parallel with a changeover from the first clutch C1 to the second clutch C2 to be carried out at 1→2 upshift (changeover phase in FIG. 4) and the subsequent rotation change (rotation change phase in FIG. 4), the total transmission torque capacity control of the starting clutches C1, C2 is performed simultaneously to cause the engine rotation trajectory change to occur corresponding to the 1→2 upshift.

Similar to FIG. 4, FIG. 6 shows the operation, in which, when the accelerator pedal is depressed at instant t1 in the vehicle stopping state and the throttle opening TVO increases from "0" to TVO1, the engine torque Te is increased from "0" to Te1 and the engine speed Ne rises as shown in the figure.

From instant t1 in accordance with the increase of such engine rotation speed Ne, the engine rotation trajectory representing the development of an engine rotation speed Ne over time is controlled so that the engine rotation trajectory matches a desired rotation trajectory as described with reference to FIG. 4.

Due to the engine rotation trajectory control, the engine speed Ne rises as shown in the figure from the starting instant t1. When the engine rotation speed Ne reaches Ne1 at the balance point P1 in FIG. 5 as shown at instant t2 in FIG. 6, the engine torque Te is balanced with the total transmission torque capacity Tc (transmission torque capacity TC1) to thereby causing the engine rotation speed Ne to stop increasing, and the engine rotation speed Ne is kept at Ne1 at instant t2 and thereafter in FIG. 6.

At instant t2 in which the total transmission torque capacity Tc (transmission torque capacity TC1) is balanced with the engine torque Te=Te1 and thereafter, in order for the engine rotation speed Ne to maintain substantially constant (desired rotation trajectory), i.e., in order to keep the balance point P1 in FIG. 5, the total transmission torque capacity Tc (transmission torque capacity TC1) is controlled as shown in FIG. 6.

At the instant t3 during the engine rotation trajectory control, when an 1→2 upshift command (shift command) is generated by an automatic shift or manual shift, control proceeds from step S11 in FIG. 3 through step S12 and step S14 to step S15. In step S15, shift control described below and the transmission torque capacity control according to one or more embodiments of the present invention will be performed at the same time.

First, a description is given of the former shift control. The shift is carried out through a changeover control from the first clutch C1 to the second clutch C2 corresponding to the 1→2 upshift command. This switchover control of the clutches is carried out, as shown in FIG. 6, by switching from a state in which TC1=Tc, TC2=0 at instant t3 to a state in which TC1=0, TC2=Tc.

More specifically, the changeover control from C1 to C2 is carried out by causing the clutch torque distribution ratio R1 to decrease from "1" to "0" gradually, while linking to the decrease of R1 to increase the clutch torque distribution ration R2 from "0" to "1" gradually. Thus, power transmission path within the transmission is switched from the transmission path for the first speed to transmission path of the second speed, and the change speed ratio is changed from the speed ration r1 before shift (first speed) to the speed ratio r2 after shift (second speed).

Incidentally, as in the conventional case, if the above described engine rotation trajectory control would be continued after the instant t3 as well, the total transmission torque capacity Tc for the starting clutch would be maintained at the value at instant t3, as indicated by the dashed line. Consequently, the engine speed Ne will be kept at Ne1 as shown by the dashed line, and the engine rotation change corresponding to the 1→2 upshift does not occur. Especially when the 1→2 upshift is a manual shift, an uncomfortable feeling is imparted to the driver.

Therefore, in the second upshift control example in FIG. 6, during the shift progress between the shift command instant t3 to shift end time t5, transmission torque capacity is controlled to cause an engine speed trajectory to occur corresponding to the 1→2 upshift.

This change in the engine rotation trajectory entails to increase the total transmission torque capacity Tc of the clutches C1, C2 so as to decrease the engine rotation speed Ne, since the type of shift is upshift. More specifically, first, a decision is made to which destination value (destination engine rotation speed) Ne2 the engine rotation is reduced based on the balance point P2 in FIG. 5 in a manner similar to the description above with reference to FIG. 4. Then, determination is made of the total transmission torque capacity Tc of the clutches C1, C2 required to achieve the target decreased engine speed Ne2 by calculation using the equation 0 described above similar to the description with reference to FIG. 4.

Subsequently, the total transmission torque capacity Tc of the clutches C1, C2 is caused to gradually increase from the instant t3 to the instant t5 from the Ne=Ne1 achieving value (transmission torque capacity Tc1 at first speed start) at instant t3 to the Ne=Ne2 achieving value (transmission torque capacity Tc2 at second speed start) at instant t5. In accordance with the gradual increase of the total transmission torque capacity Tc from Tc1 to Tc2, during instant t3 to t5, the transmission torque capacity TC2 of the second clutch C2 will increase gradually as shown in the figure, while the transmitting torque TC1 of the first clutch C1 decreases gradually as shown.

Due to gradual increase in the transmitting torque TC2 of the second clutch C2 as well as gradual decrease in the transmission torque capacity TC1 of the first clutch C1 between instant t3 and instant t5 as shown, the engine rotation speed gradually decreases from Ne1 to Ne2. Thus, it is possible to cause the engine rotation trajectory to change in a decreasing direction in response to the 1→2 upshift, to thereby avoid the discomfort described above. Note in the present second upshift control example, since the engine rotation trajectory is caused to change during the shift operation between instants t3 and t5, an additional effect may be achieved in which the feeling of discomfort described above may be avoided without sacrificing the shift responsiveness.

On reaching the equilibrium or balance point P2 in FIG. 5 at the instant t5, the total transmission torque capacity Tc of the clutches C1, C2 will be balanced with the engine torque Te=Te1, and reduction of the engine speed Ne stops. At the instant t5 and thereafter, in order for the engine speed Ne to be kept Ne=Ne2, the total transmitting torque of the clutches C1, C2 (transmission torque capacity TC2 of the second clutch C2) will be controlled. Then, at instant t6, at which the engine speed Ne (=Ne2) matches the second clutch output rotation speed Nout2, the second clutch C2 is placed in a completely engaged state to thereby terminate the shift. Subsequently, when the vehicle speed VSP exceeds a predetermined vehicle speed above which the engine rotation trajectory control is impermissible, the engine rotation trajectory control ends.

(C) Third Upshift Control Example (Changeover Preceding Type, Part 2)

Figure 7:
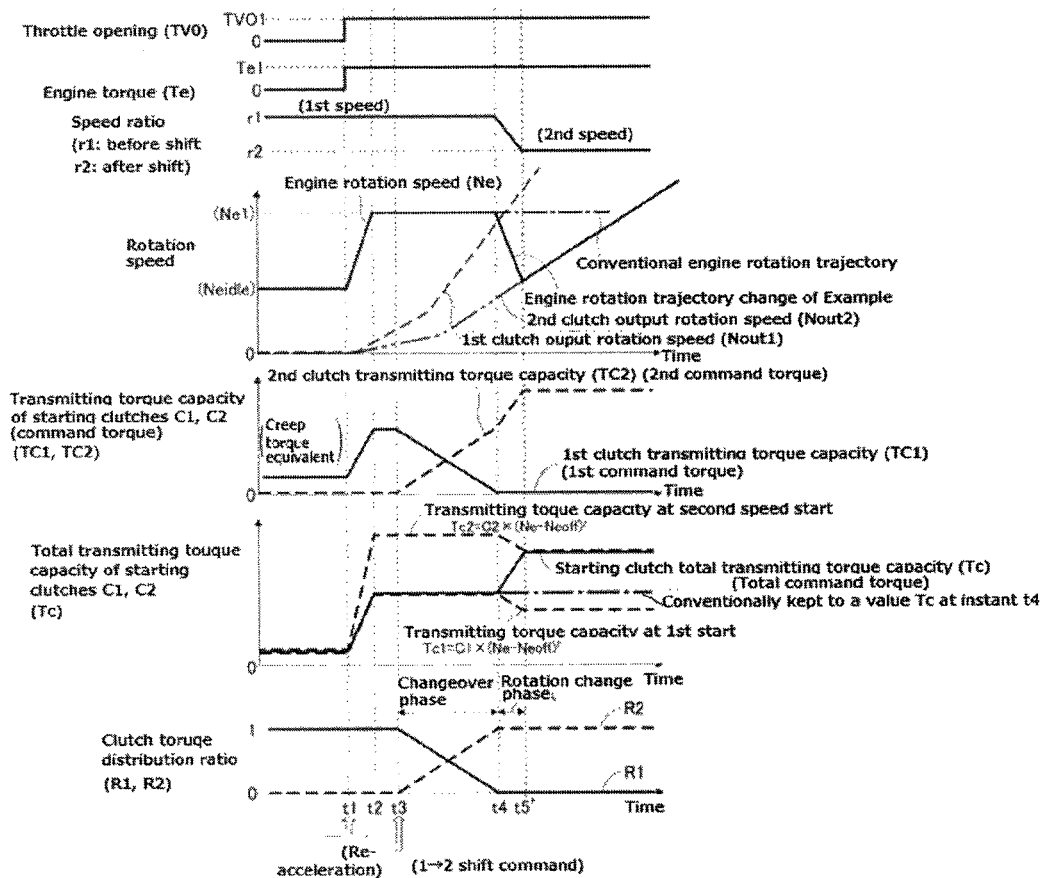
FIG. 7 is an operation time chart showing a third example of the upshift control by the control program shown in FIG. 3.

FIG. 7, similarly to FIG. 4, illustrates another upshift control example (Changeover preceding type, Part 2) in which the switch or changeover from the first clutch C1 to the second clutch, which is to take place when performing 1→2 upshift control, is performed in advance, and the total transmission torque capacity of the starting clutches C1, C2 is controlled to generate the engine rotation trajectory change corresponding to the 1→2 upshift.

In FIG. 7 similarly in FIG. 4, when the accelerator pedal is depressed at time t1 in the vehicle stopping state and the throttle opening TVO increases from "0" to TVO1, the engine torque Te is increased from "0" to Te1 so that the engine speed Ne rises as shown in the figure. From time t1 in accordance with the increase of such engine rotation speed Ne, the engine rotation trajectory representing the development of an engine rotation speed Ne over time is controlled so that the engine rotation trajectory matches a desired rotation trajectory.

Due to the engine rotation trajectory control, the engine speed Ne rises as shown in the figure from the starting instant t1. When the engine rotation speed Ne reaches Ne1 at the balance point P1 in FIG. 5 as shown at instant t2 in FIG. 7, the engine torque Te is balanced with the total transmission torque capacity Tc (transmission torque capacity TC1) to thereby causing the engine rotation speed Ne to stop increasing, and the engine rotation speed Ne is kept at Ne1 at instant t2 and thereafter in FIG. 7.

At instant t2 in which the total transmission torque capacity Tc (transmission torque capacity TC1) is balanced with the engine torque Te=Te1 and thereafter, in order for the engine rotation speed Ne to maintain substantially constant (desired rotation trajectory), i.e., in order to keep the balance point P1 in FIG. 5, the total transmission torque capacity Tc (transmission torque capacity TC1) is controlled as shown in FIG. 7.

At the instant t3 during the engine rotation trajectory control, when an 1→2 upshift command (shift command) is generated by an automatic shift or manual shift, control proceeds from step S11 in FIG. 3 through step S12 and step S14 to step S15. In step S15, shift control described below and the transmission torque capacity control according to one or more embodiments of the present invention will be performed.

First, a changeover control from the first clutch C1 to the second clutch C2 corresponding to the 1→2 upshift command is carried out during instant t3 and instant t4 in a manner similarly in FIG. 4 by causing the clutch torque distribution ratio R1 to decrease from "1" to "0" gradually, while linking to the decrease of R1 to increase the clutch torque distribution ration R2 from "0" to "1" gradually. Thus, power transmission path within the transmission is switched from the transmission path for the first speed to transmission path for the second speed.

From the instant t4 in which the changeover phase is concluded described above, a rotation change phase occurs which changes speed ratio from the speed ratio r1 (before shift) to the speed ratio r2 (second speed). Incidentally, as in the conventional case, if the above described engine rotation trajectory control would be continued after the instant t4 as well, the total transmission torque capacity Tc for the starting clutch would be maintained at the value at instant t4, as indicated by the dashed line. Consequently, the engine speed Ne will be kept at Ne1 as shown by the dashed line, and the engine rotation change corresponding to the 1→2 upshift does not occur. Especially when the 1→2 upshift is a manual shift, an uncomfortable feeling is imparted to the driver.

Therefore, in the present third upshift control example illustrated in FIG. 7, during the rotation changes phase from instant t4, the transmission torque capacity of the clutches C1, C2 is controlled as described below and an engine rotation trajectory or path that corresponds to the 1→2 upshift is caused to occur.

This change in the engine rotation trajectory entails to increase the total transmission torque capacity Tc of the clutches C1, C2 so as to decrease the engine rotation speed Ne, since the type of shift is upshift. More specifically, without using the target decreased engine rotation speed Net, which is described above with reference to FIG. 4, at the rotation change phase start instant t4 and thereafter, the total transmission torque capacity Tc of the clutches C1, C2 is gradually increased from the Ne=Ne1 achieving value (transmission torque capacity Tc1 at first speed start) to an achieving value of second clutch complete engagement at instant t5'. In accordance with increase in the total transmission torque capacity Tc from Tc1 to Tc2, during instants t4 and t5, the transmission torque capacity TC2 of the second clutch C2 will increase gradually as shown in the figure.

As described, due to the gradual increase in the transmission torque capacity TC2 of the second clutch C2 during instant t4 and t5, the engine rotation speed Ne gradually lowers from Ne1 to the second clutch output rotation speed Nout2 at instant T5'. Thus, the engine rotation trajectory may be changed in a decreasing direction in response to the 1→2 during a rotation change phase between instants t4 and t5, which makes it possible to avoid the discomfort described above. Note that, in the present upshift control example, since the amount of change in the engine rotation trajectory between instants t4 and t5' may be set to be great, an additional effect of reliably avoiding the discomfort may be obtained.

When the second clutch C2 is completely engaged at instant t5', the engine speed Ne is place to the same speed as the second clutch output rotation speed Nout2, and is increased along with the second clutch output rotation speed Nout2.

Then, at instant t6, at which the engine speed Ne (=Ne2) matches the second clutch output rotation speed Nout2, the second clutch C2 is placed in a completely engaged state to thereby terminate the shift. Subsequently, when the vehicle speed VSP exceeds a predetermined vehicle speed above which the engine rotation trajectory control is impermissible, the engine rotation trajectory control ends.

(Downshift Clutch Transmission Torque Capacity Control)

In step S16, the transmission torque capacity control of the clutches C1, C2, which is to be executed due to occurrence of a downshift command during the engine rotation trajectory control will be detailed based on first to fifth downshift upshift control examples below. Note that the presumed driving scene is as follows:

(1) During deceleration running or driving in the second speed in the D range (that is, during deceleration driving in a state of first speed pre-shifting and the second speed pre-shifting, with the first clutch C1 released and the second clutch C2 engaged), due to the vehicle speed VSP falling below a predetermined low vehicle speed at which engine rotation trajectory control is possible, the second clutch C2 performs an engine rotation trajectory control due to decrease in the transmission torque capacity, (2) Re-acceleration is initiated by the depression on the accelerator pedal, and (3) During the engine rotation trajectory control in such reacceleration, a 2→1 downshift command occurs by an automatic shift or manual shift.

(D) First Downshift Control Example 1 (Changeover Preceding Type)

Figure 8:
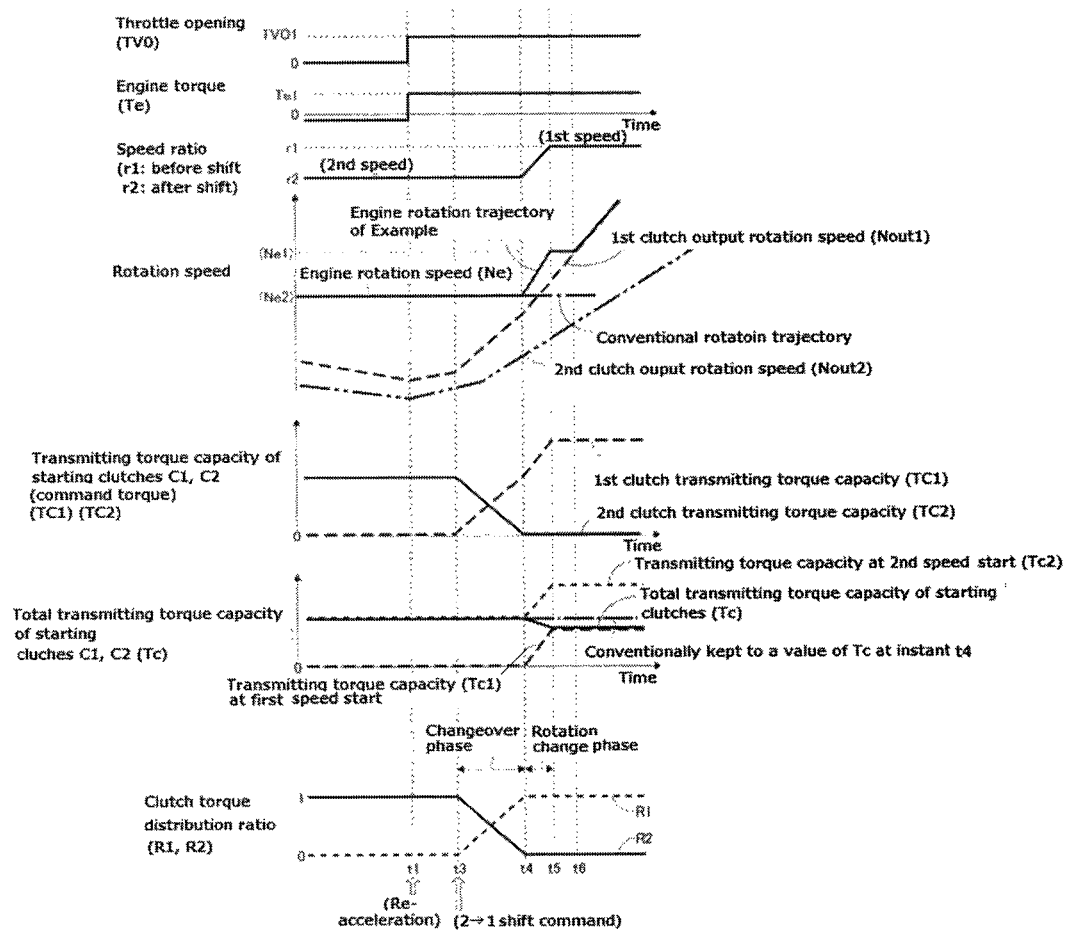
FIG. 8 is an operation time chart showing a first example of the downshift control by the control program shown in FIG. 3.

FIG. 8 illustrates a first downshift control example (Changeover preceding type control example) in which the switch or changeover from the second clutch C2 to the first clutch C1, which is to take place when performing 2→1 downshift control, is performed in advance, and the total transmission torque capacity of the starting clutches C1, C2 is controlled thereafter to generate the engine rotation trajectory change corresponding to the 2→1 downshift.

When the accelerator pedal is depressed at instant t1 due to operation of (2) above and the throttle opening TVO increases from "0" to TVO1, along with this operation, the engine torque Te is increased from a negative value during deceleration to a positive value Te1. However, despite the increase of such a throttle opening TVO, the engine speed Ne is kept in the engine speed Ne2 at the balance or equilibrium point P2 in FIG. 5 by the engine rotation trajectory control based on the equation (7).

At the instant t3 during the engine rotation trajectory control, when a 2→1 downshift command (shift command) is generated by an automatic shift or manual shift, control proceeds from step S11 in FIG. 3 through step S12 and step S14 to step S16. In step S16, shift control described below and the transmission torque capacity control according to one or more embodiments of the present invention will be performed.

First, during instants between t3 and t4, the changeover from the second clutch C2 to the first clutch C1 is performed in response to the 2→1 downshift command. The changeover control of the clutches C1, C2, is carried out, as shown in FIG. 8, by switching from a state in which TC2=Tc, TC1=0 at instant t3 over to a state in which TC2=0, TC1=Tc. More specifically, the changeover control from C2 to C1 is carried out by causing the clutch torque distribution ratio R2 to decrease from "1" to "0" gradually, while linking to the decrease of R2 to increase the clutch torque distribution ration R1 from "0" to "1" gradually. Thus, power transmission path within the transmission is switched from the transmission path for the second speed to transmission path for the first speed.

From instant t4 that the changeover phase described above is terminated until instant t5, a rotation change phase is generated in which the change speed ratio transitions from the speed ratio r2 before shifting (second speed) to the speed ratio r1 after shifting (first speed). However, as in the conventional technique, if the above described engine rotation trajectory control would be continued after the instant t4, the total transmission torque capacity Tc for the starting clutches would be maintained at the value of instant t4, as indicated by the dashed line. Consequently, the engine speed Ne will be kept at Ne2 as shown by the dashed line, and the engine rotation change corresponding to the 2→1 downshift does not occur. Especially when the 2→1 downshift is a manual shift, an uncomfortable feeling is imparted to the driver. Therefore, in the first downshift control example in FIG. 8, by controlling the transmission torque capacity of the clutches C1, C2 as described below from the time of changeover phase completion t4, the change in the engine rotation trajectory corresponding to the 2→1 downshift will be caused to occur.

This change in the engine rotation trajectory entails to decrease the total transmission torque capacity Tc of the clutches C1, C2 so as to increase the engine rotation speed Ne, since the type of shift is downshift. More specifically, first, a decision is made to which destination or target increased value (target increased engine rotation speed) Ne1 the engine rotation is increased. Since, after the downshift, the engine rotation trajectory control is performed at the first speed, Tc1 is obtained by the following equation analogous to the equation (1) described above.

$$Tc1 = C1 \times (Ne - Neoff)^2 \quad (8)$$

Wherein,
C1: torque capacity coefficient of the second clutch C2 (C2>C1)
Ne: engine rotation speed
Neoff: engine rotation correction amount.

The engine rotation speed Ne1 at which the transmission torque capacity Tc1 in the first speed start by the first clutch C1 with the change characteristic in FIG. 5 balances with the current engine torque Te1 is obtained from the engine rotation speed at the balance point P1 in FIG. 5, and the engine rotation speed Ne1 is defined as the target increased engine rotation speed.

Then, determination is made of the total transmission torque capacity of the clutches C1, C2 required to achieve the target increased engine speed Ne1.

The transmission torque capacity Te1 at the first speed start, which is obtained by substituting the target increased engine rotation speed Ne1 in the above described equation (8) indicating the transmission torque capacity Tc1 at the first speed start will be set as the total transmission torque capacity Tc of the clutches C1, C2 required for achieving the target increased engine rotation speed Ne1:

$$Tc = Tc1 = C1 \times (Ne1 - Neoff)^2 \quad (9)$$

Subsequently, the total transmission torque capacity Tc of the clutches C1, C2 is caused to gradually decrease from the instant t4 to the instant t5 from the Ne=Ne2 achieving value (transmission torque capacity Tc2 at second speed start) at instant t4 to the Ne=Ne1 achieving value (transmission torque capacity Tc1 at first speed start) at instant t5. In accordance with the gradual decrease of the total transmission torque capacity Tc from Tc2 to Tc1, during instant t4 to t5, the transmission torque capacity TC1 of the first clutch C1 will decrease gradually as shown in the figure. As described, due to the gradual decrease in the transmission torque capacity TC1 of the first clutch C1 during instant t4 and t5, the engine rotation speed Ne gradually increases from Ne2 toward Ne1. Thus, the engine rotation trajectory may be changed in an increasing direction in response to the 2→1 downshift during the rotation change phase between instants t4 and t5, which makes it possible to avoid the discomfort described above.

On reaching the equilibrium or balance point P1 in FIG. 5 at the instant t5, the total transmission torque capacity Tc of the clutches C1, C2 will be balanced with the engine torque Te=Te1, and the increase of the engine speed Ne stops.

At the instant t5 and thereafter, in order for the engine speed Ne to be kept Ne=Ne1, the total transmitting torque of the clutches C1, C2 (transmission torque capacity TC1 of the first clutch C1) will be controlled. Then, at instant t6, at which the engine speed Ne (=Ne1) matches the first clutch output rotation speed Nout1, the first clutch C1 is placed in a completely engaged state to thereby terminate the shift. Subsequently, when the vehicle speed VSP exceeds a predetermined vehicle speed above which the engine rotation trajectory control is impermissible, the engine rotation trajectory control ends.

(e) Second Downshift Control Example (Simultaneous Changeover and Rotation Change Type)

Figure 9:
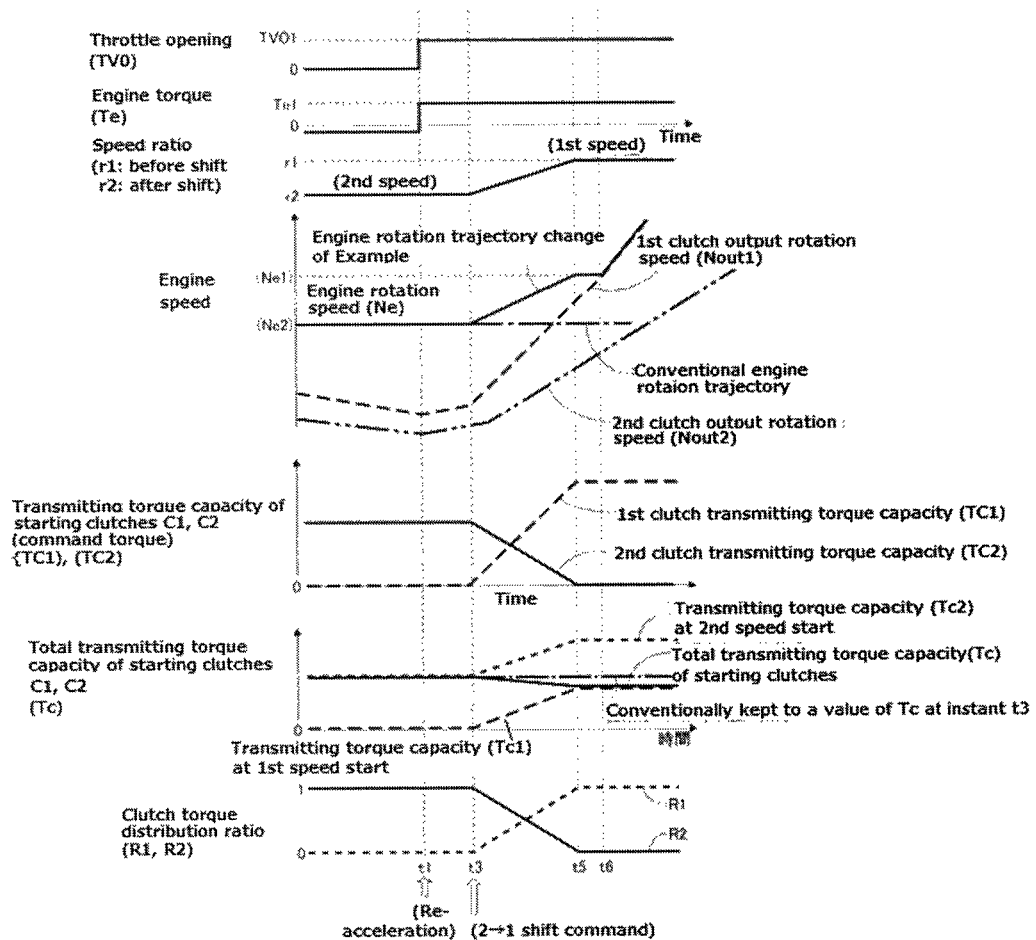
FIG. 9 is an operation time chart showing a second example of the downshift control by the control program shown in FIG. 3.

FIG. 9 shows a second downshift control example (simultaneous changeover & rotation change type) in which, in addition to the changeover from the second clutch C2 to the first clutch C1 to be carried out at 2→1 downshift (changeover phase in FIG. 8) and the subsequent rotation change (rotation change phase in FIG. 8), the total transmission torque capacity control of the starting clutches C1, C2 is performed in parallel to cause the engine rotation trajectory change to occur corresponding to the 2→1 downshift.

Similar to FIG. 9, also in FIG. 8, when the accelerator pedal is depressed at instant t1 for re-acceleration during the decoration at second speed, the throttle opening TVO increases from "0" to TVO1, and the engine torque Te is increased from a negative value during deceleration to a positive value Te1. However, despite the increase of the engine torque Te from the negative value during deceleration to a positive value Te1, the engine speed Ne is kept at the engine speed Ne2 at the balance or equilibrium point P2 in FIG. 5 by the engine rotation trajectory control based on the equation (7). The description below is made with reference to the operation thereafter.

At the instant t3 during the engine rotation trajectory control, when a 2→1 downshift command (shift command) is generated by an automatic shift or manual shift, control proceeds from step S11 in FIG. 3 through step S12 and step S14 to step S16. In step S16, shift control described below and the transmission torque capacity control according to one or more embodiments of the present invention will be performed at the same time.

First, a description is given of the former shift control. The shift is carried out through a changeover control from the second clutch C2 to the first clutch C1 corresponding to the 2→1 downshift command. This changeover control of the clutches is carried out, as shown in FIG. 9, by switching from a state in which TC2=Tc, TC1=0 at instant t3 to a state in which TC2=0, TC1=Tc. More specifically, the changeover control from C2 to C1 is carried out by causing the clutch torque distribution ratio R2 to decrease from "1" to "0" gradually, while linking to the decrease of R2 to increase the clutch torque distribution ratio R1 from "0" to "1" gradually. Thus, the power transmission path within the transmission is switched from the transmission path for the second speed to transmission path of the first speed, and the change speed ratio changes from the speed ratio r2 before shift (second speed) to the speed ratio r2 after shift (first speed).

Incidentally, as in the conventional case, if the above described engine rotation trajectory control would be continued after the instant t3 as well, the total transmission torque capacity Tc for the starting clutch would be maintained at the value at instant t3, as indicated by the dashed line. Consequently, the engine speed Ne will be kept at Ne2 as shown by the dashed line, and the engine rotation change corresponding to the 2→1 downshift does not occur. Especially when the 2→1 downshift is a manual shift, an uncomfortable feeling is imparted to the driver.

Therefore, in the second downshift control example in FIG. 9, during the shift progress between the shift command instant t3 to shift end time t5, the transmission torque capacity is controlled to cause an engine speed trajectory to occur corresponding to the 2→1 downshift This change in the engine rotation trajectory entails to decrease the total transmission torque capacity Tc of the clutches C1, C2 so as to increase the engine rotation speed Ne, since the type of shift is downshift. More specifically, first, a decision is made as to which destination or target increased value (target increased engine rotation speed) Ne1 the engine rotation is increased based on the balance point P1 in FIG. 5 in a manner similar to the description above with reference to FIG. 8. Then, determination is made of the total transmission torque capacity Tc of the clutches C1, C2 required to achieve the target increased engine speed Ne1 by calculation using the equation (9) described above similar to the description with reference to FIG. 8

Subsequently, the total transmission torque capacity Tc of the clutches C1, C2 is caused to gradually decrease between the shift command instant t3 to the shift command instant t5 from the Ne=Ne2 achieving value (transmission torque capacity Tc2 at second speed start) at instant t3 to the Ne=Ne1 achieving value (transmission torque capacity Tc1 at first speed start) at instant t5. In accordance with the gradual decrease in the total transmission torque capacity Tc from Tc2 to Tc1, between instant t3 and t5, the transmission torque capacity TC1 of the first clutch C1 will increase gradually as shown in the figure, while the transmitting torque TC2 of the second clutch C2 decreases gradually as shown.

Due to gradual increase in the transmitting torque TC1 of the first clutch C1 as well as gradual decrease in the transmission torque capacity TC2 of the second clutch C2 between instant t3 and instant t5 as shown, the engine rotation speed gradually increases from Ne2 toward Ne1. Thus, it is possible to cause the engine rotation trajectory to change in an increasing direction in response to the 2→1 downshift, to thereby avoid the discomfort described above. Note that, in the present second downshift control example, since the engine rotation trajectory is caused to change during the shift operation between instants t3 and t5, an additional effect may be achieved in which the feeling of discomfort described above may be avoided without sacrificing the shift responsiveness.

On reaching the equilibrium or balance point P1 in FIG. 5 at the instant t5, the total transmission torque capacity Tc of the clutches C1, C2 will be balanced with the engine torque Te=Te1, and increase of the engine speed Ne stops.

At the instant t5 and thereafter, in order for the engine speed Ne to be kept at Ne=Ne1, the total transmitting torque of the clutches C1, C2 (transmission torque capacity TC1 of the first clutch C1) will be controlled. Then, at instant t6, at which the engine speed Ne (=Ne1) matches the first clutch output rotation speed Nout1, the first clutch C1 is placed in a completely engaged state to thereby terminate the shift. Subsequently, when the vehicle speed VSP exceeds a predetermined vehicle speed above which the engine rotation trajectory control is impermissible, the engine rotation trajectory control ends.

(f) Third Downshift Control Example (Rotation Change Preceding Type, Part 1)

Figure 10:
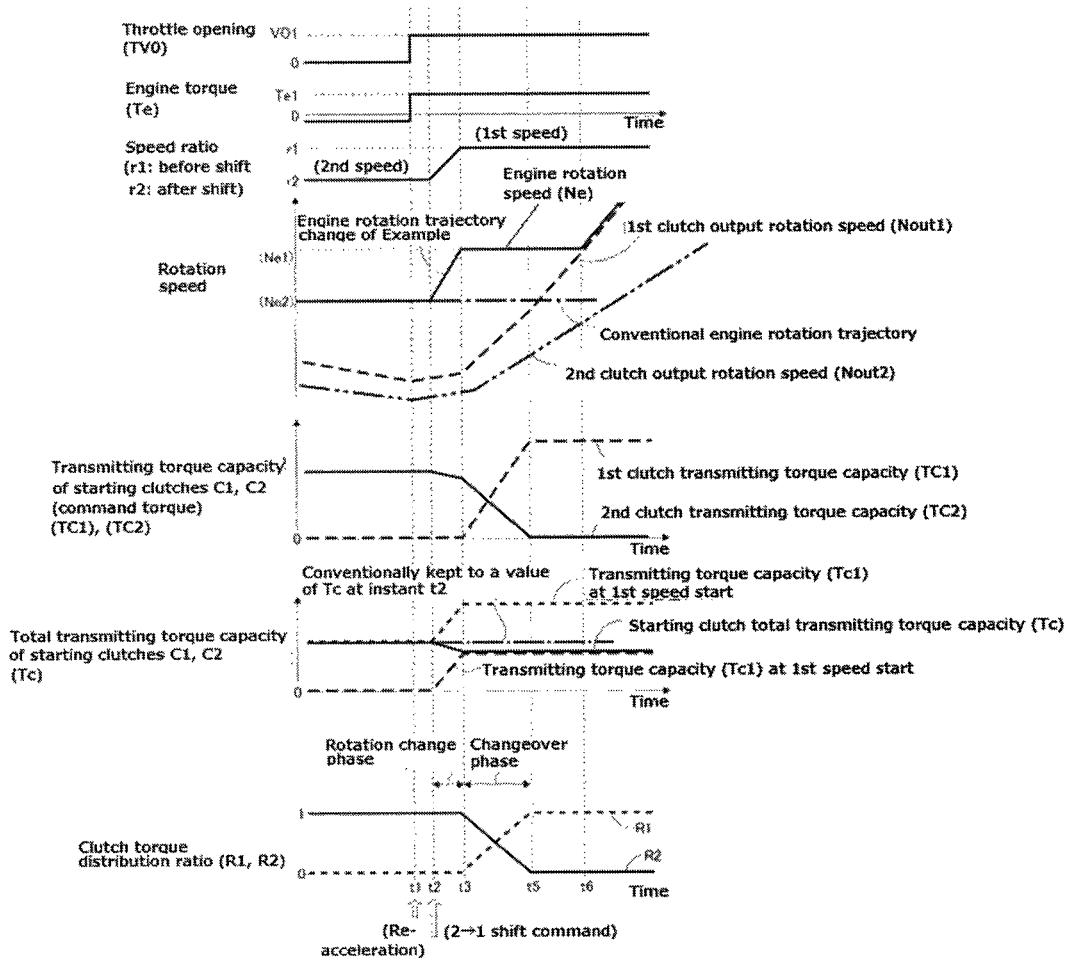
FIG. 10 is an operation time chart showing a third example of the downshift control by the control program shown in FIG. 3.

FIG. 10 shows a third downshift control example (rotation change preceding type, part 1) in which, by allowing the transmission input side rotation speed to change (rotation change phase) prior to the changeover (changeover phase) from the second clutch C2 to the first clutch C1, which is to take place at a 2→1 downshift operation to thereby meet the requirement for interlocking prevention, during the preceding rotation change phase, the total transmission torque capacity control of the starting clutches C1, C2 is performed to cause the engine rotation trajectory change to occur corresponding to the 2→1 downshift.

Similar to FIGS. 8, 9, also in FIG. 10, when the accelerator pedal is depressed at instant t1 for re-acceleration during the decoration at second speed, the throttle opening TVO increases from "0" to TVO1, and the engine torque Te is increased from a negative value during deceleration to a positive value Te1. However, despite the increase of the engine torque Te from the negative value during deceleration to a positive value Te1, the engine speed Ne is kept at the engine speed Net at the balance or equilibrium point P2 in FIG. 5 by the engine rotation trajectory control based on the equation (7). The description below is made with reference to the operation thereafter.

At the instant t3 during the engine rotation trajectory control, when a 2→1 downshift command (shift command) is generated by an automatic shift or manual shift, control proceeds from step S11 in FIG. 3 through step S12 and step S14 to step S16. In step S16, shift control described below and the transmission torque capacity control according to one or more embodiments of the present invention will be performed at the same time.

First, at shift command instant t2, in order to initiate the latter transmission torque capacity control, the target increased rotation speed Ne1 (target increased engine rotation speed) is obtained from the balance point P1 in FIG. 5, in a manner similar to the description with reference to FIG. 8. Then, the total transmission torque capacity Tc of the clutches C1, C2 required for realizing the target increased engine rotation speed Ne1 is obtained by calculation of the above described equation (9) in a manner similar to that described with reference to FIG. 8.

Subsequently, the total transmission torque capacity Tc of the clutches C1, C2 is caused to gradually decrease between the shift command instant t2 and the rotation change phase termination instant t3 from the Ne=Ne2 achieving value (transmission torque capacity Tc2 at second speed start) at instant t2 to the Ne=Ne1 achieving value (transmission torque capacity Tc1 at first speed start) at instant t3. In accordance with the decrease of the total transmission torque capacity Tc from Tc2 to Tc1, between instants t2 and t3, while the transmission torque capacity TC1 of the first clutch C1 is maintained as shown in the figure, the transmission torque capacity TC2 of the second clutch C2 will decrease gradually as shown in the figure.

Between instant t2 and t3, with the transmitting toque capacity TC1 of the first clutch C1 kept to "0", and due to gradual decrease in the transmission torque capacity TC2 of the second clutch C2, the engine rotation speed Ne increases gradually from Ne2 to Ne1 so that, in the rotation change phase between instants t2 and t3, the engine rotation trajectory may be changed in an increasing direction, which makes it possible to avoid the discomfort described above.

Incidentally, if the above described engine rotation trajectory control would be continued after the shift command instant t2 as well, the total transmission torque capacity Tc for the starting clutch would be maintained at the value at instant t2, as indicated by the dashed line. Consequently, the engine speed Ne will be kept at Ne2 as shown by the dashed line, and the engine rotation change corresponding to the 2→1 downshift does not occur. Especially when the 2→1 downshift is a manual shift, an uncomfortable feeling is imparted to the driver.

However, in the present third downshift control example, as described above, the discomfort may be resolved. Moreover, in the present third downshift control examples, since the engine rotation trajectory is changed in an initial stage between t2 and t3 of shifting, the discomfort described above may be more reliably avoided.

On reaching the equilibrium or balance point P1 in FIG. 5 at the instant t3, the total transmission torque capacity Tc of the clutches C1, C2 will be balanced with the engine torque Te=Te1, and the increase of the engine speed Ne stops.

At the instant t3 and thereafter, in order for the engine speed Ne to be kept at Ne=Ne1, the total transmitting torque of the clutches C1, C2 (transmission torque capacity TC1 of the first clutch C1) will be controlled.

At instant t3, a changeover control is performed at the same time from the second clutch C2 to the first clutch C1 corresponding to the 2→1 downshift command. This changeover control of the clutches is carried out, as shown in FIG. 10, by switching from a state in which TC2=Tc, TC1=0 at instant t3 to a state in which TC2=0, TC1=Tc.

More specifically, the changeover control from C2 to C1 is carried out by causing the clutch torque distribution ratio R2 to decrease from "1" to "0" gradually, while linking to the decrease of R2 to increase the clutch torque distribution ratio R1 from "0" to "1" gradually.

At the termination instant t5 of the clutch changeover control, the power transmission path within the transmission is switched from the transmission path for the second speed to transmission path of the first speed, and the change speed ratio changes from the speed ratio r2 before shift (second speed) to the speed ratio r2 after shift (first speed). At the instant t3 and thereafter, the engine rotation speed Ne is kept at Ne=Ne1, as described above. However, at the instant t6 at which the engine rotation speed Ne (=Ne1) matches the first clutch output rotation speed Nout1, the first clutch C1 will be placed in a fully engaged state to terminate shifting. Subsequently, when the vehicle speed VSP exceeds a predetermined vehicle speed above which the engine rotation trajectory control is impermissible, the engine rotation trajectory control ends.

(g) Fourth Downshift Control Example (Rotation Change Preceding Type, Part 2)

Figure 11:
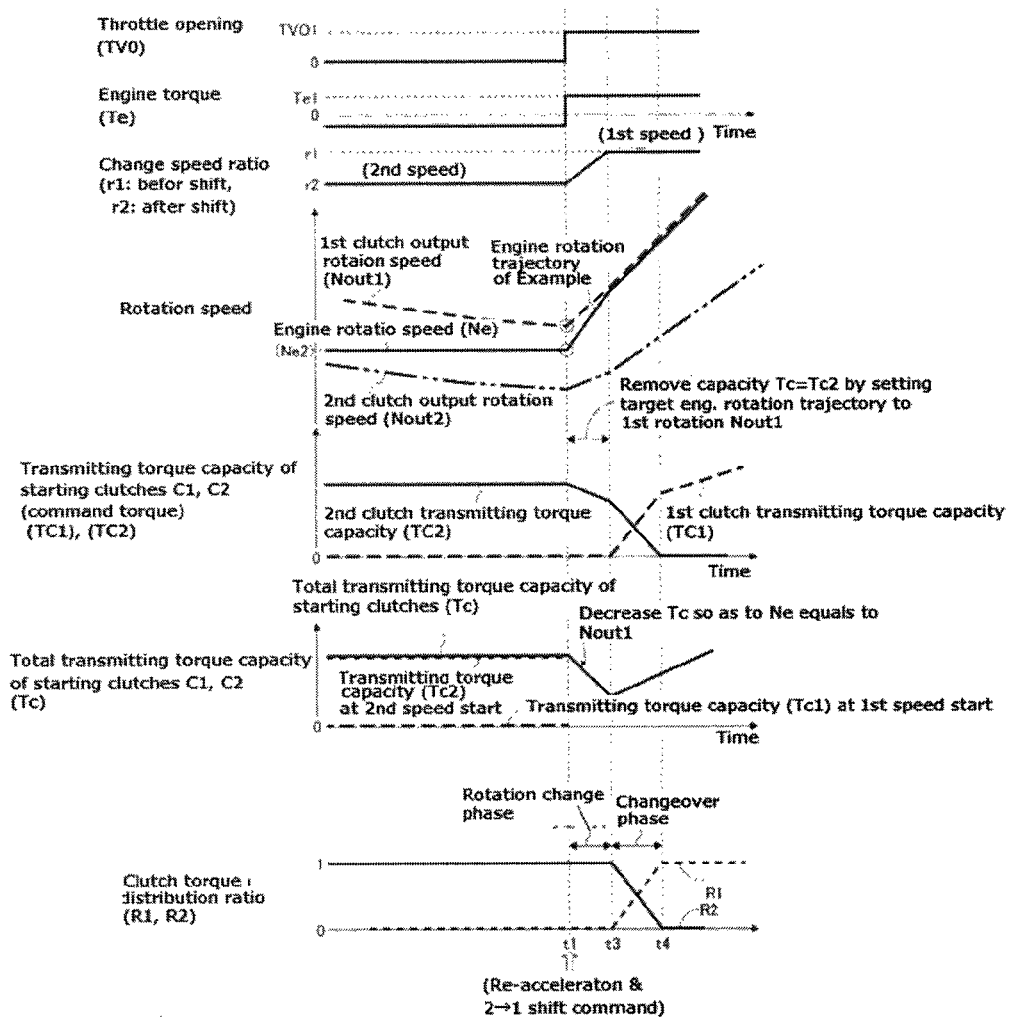
FIG. 11 is an operation time chart showing a fourth example of the downshift control by the control program shown in FIG. 3.

FIG. 11 shows a fourth downshift control example (rotation change preceding type, part 2) in which the accelerator pedal is depressed at instant t1 for re-acceleration during the deceleration at second speed, the throttle opening TVO increases from "0" to TVO1, and the engine torque Te is increased from a negative value during deceleration to a positive value Te1. When shifting in response to a 2→1 downshift command upon depression at the re-acceleration instant t1, as in the case of FIG. 10, it is necessary to generate a rotation change phase prior to the changeover phase. Further, such a case is assumed that the engine rotation speed Ne at the 2→1 downshift command instant t1 is lower than the first clutch output rotation speed Nout1 (engine rotation speed after shift).

In this control example, since the engine rotation speed Ne is lower than the first clutch output rotation speed Nout1 (engine rotation speed after the shift), the engine rotation trajectory control to maintain the engine rotation speed Ne at the engine rotation speed Ne2 at the balance point P2 in FIG. 5 is terminated, and the total transmission torque capacity Tc of the clutches C1, C2 will be controlled as described below so as to generate an engine rotation change corresponding to the 2→1 downshift.

More specifically, from the shift command instant t1 on, the total transmission torque capacity Tc of the clutches C1, C2 (transmission torque capacity TC2 of the second clutch C2) is caused to decrease so that the engine rotation speed Ne increases toward the output rotation speed Nout1 of the first clutch C1 representing the engaging side clutch at 2→1 downshift. Thus, due to increase in the engine rotation speed Ne until instant t3 at which Ne=Nout1 state is attained, the rotation change phase progresses at the time of the 2→1 downshift, while allowing the driver to perceive that the speed change has been made so that the uncomfortable feeling may be avoided.

At instant t3 at which the state of Ne=Nout1 is achieved, and thereafter, the total transmitting clutch capacity Tc of the clutches C1, C2 is increased toward a value allowing the transmission input torque and the rotation inertial phase are available. The total transmission torque capacity Tc thus increased will be distributed by the clutch torque distribution ratios R1, R2. Thus, the transmission torque capacity TC1 of the first clutch C1 is gradually increased toward the Tc from "0", and the transfer torque capacity TC2 of the second clutch C2 is lowered from the value at time t3 toward "0". At instant t4, the changeover from the second clutch C2 to the first clutch C1 (i.e. 2→1 downshift) will be completed.

(h) Fifth Downshift Control Example (Manual Shift Changeover Preceding Type)

Figure 12:
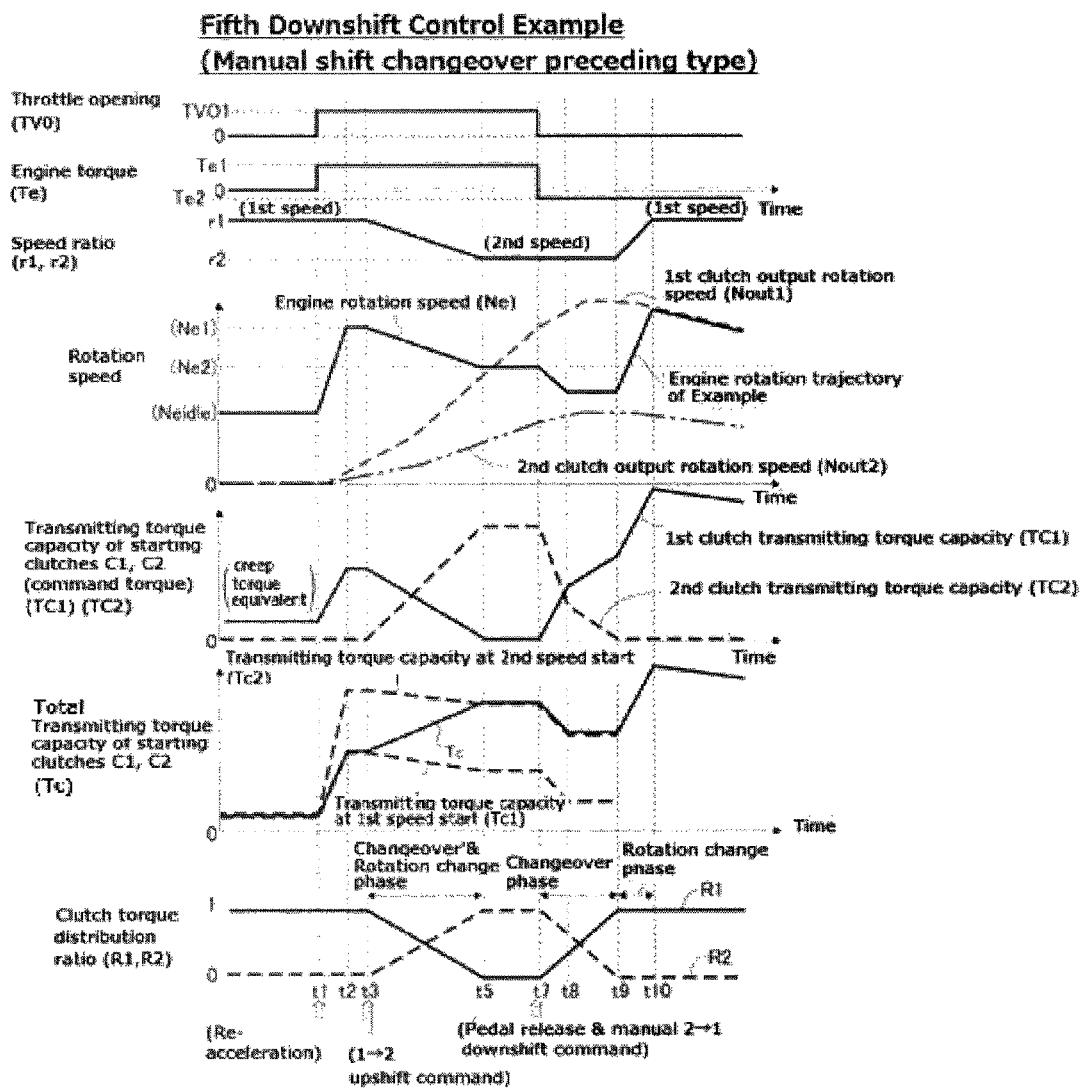
FIG. 12 is an operation time chart showing a fifth example of the downshift control by the control program shown in FIG. 3.

FIG. 12 shows a fifth downshift control example in which, following the execution of the upshift control similar to that of the second control example shown in FIG. 6 up to instant t5, the state switches to a coasting running (inertial running) in response to release of the accelerator pedal (the throttle opening TVO=0) with the engine torque T3 being equal to a negative value Te2, and, at the time of the release of the accelerator pedal t7, the driver issues a 2→1 downshift command by a manual shift operation.

In such a 2→1 downshift responsive to an accelerator pedal release, the engine rotation speed Ne cannot be increased by the second clutch C2, but the first clutch C1 has to be in place. Thus, a changeover from the second clutch C2 to the first clutch C1 is carried out first, which is required for 2→1 downshift.

Thus, the engine rotation speed Ne is lowered from instant 7 as shown in the figure, and, in response to such reduction of the engine speed Ne, the engine trajectory control causes to decrease the total transmission torque capacity Tc of the clutches C1, C2 (transmission torque capacity Tc2 at second speed start) from instant t7. Upon reaching a state at instant t8 in which the total transmission torque capacity Tc of the clutches C1, C2 is balanced with Te=Te2, the decrease in the engine rotation speed Ne stops. At instant t8 and thereafter, while the total transmission torque capacity Tc of the clutches C1, C2 is determined in order for the engine rotation speed Ne to be maintained at the value of instant t8, the total transmission torque capacity Tc is distributed between the transmission torque capacity TC1 of the first clutch C1 and the transmission torque capacity TC2 of the second clutch C2 according to the clutch torque distribution ratios R1, R2 to thereby further advance the changeover process from the second clutch C2 to the first clutch C1.

From instant t9 on, at which such a changeover of clutches C1, C2 ends, control is performed to generate change in the engine rotation trajectory corresponding to the 2→1 downshift. More specifically, at the instant t9, the engine rotation trajectory control described above is terminated. Between instants t9 and t10, the total transmission torque capacity Tc of the clutches C1, C2 (transmission torque capacity TC1 of the second clutch C2) is gradually increased as shown so that the engine rotation speed Ne increases from the value at instant t9 to the first clutch output rotation speed Nout1. Following the increase in the engine rotation speed Ne, at instant t10 at which Ne equals to Nout1, the first clutch C1 comes to a fully engaged state to terminate the control. Based on the increase in the engine rotation speed Ne between instants t9 and t10, the driver can recognize the 2→1 downshift in response to the manual shift command so that the discomfort described above may be avoided.

Other Examples

Incidentally, in the examples described above, the starting clutch control device is described with respect to the case in which the automatic transmission is a twin clutch type automated manual transmission shown in FIG. 1. However, the starting clutch control device according to one or more embodiments of the present invention may be similarly applied to other types of transmission such as a stepped automatic transmission with a starting clutch or a continuously variable transmission with a starting clutch as well.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS

E engine (power source)
C1 first clutch (starting clutch)
C2 second clutch (starting clutch)
G1 first speed gear set
G2 second speed gear set
G3 third speed gear set
G4 fourth speed gear set
G6 sixth speed gear set
GR reverse gear set
28 1-R synchromesh mechanism
29 3-5 synchromesh mechanism
37 6-N synchromesh mechanism
38 2-4 synchromesh mechanism
41 3-5 shift fork
42 1-R shift fork
43 6-N shift fork
44 2-4 shift fork
45 actuator unit
46 clutch hydraulic module
48 first shift rod
49 3-5 shift bracket
50 3-5 shift actuator
51 second shift rod
52 1-R shift actuator
53 6-N shift actuator
54 2-4 shift actuator
59 actuator hydraulic module

The invention claimed is:

1. A starting clutch control device for an automatic transmission comprising:
   a starting clutch controller,
   wherein the starting clutch control device controls a transmission torque capacity of a starting clutch interposed in a transmission path in which rotation of a power source is transmitted to wheels while shifting is underway by the automatic transmission,
   wherein the starting clutch controller controls the transmission torque capacity of the starting clutch such that a rotation trajectory of the power source develops as desired in a rotation speed range in which the transmission torque capacity control of the starting clutch is necessary,
   wherein the starting clutch controller causes the transmission torque capacity of the starting clutch to change, when a shift of the automatic transmission occurs during the transmission torque capacity control by the starting clutch controller, in a direction in which the change in the rotation trajectory will occur corresponding to the shift,
   wherein, when the shift of the automatic transmission that occurs during the transmission torque capacity control is an upshift, the starting clutch controller increases the transmission torque capacity of the starting clutch to thereby change the rotation trajectory in a rotation decreasing direction,
   wherein, when the shift is a downshift, the starting clutch controller decreases the transmission torque capacity of the starting clutch to thereby change the rotation trajectory in the rotation increasing direction,
   wherein the starting clutch controller determines whether a shift command is issued to the automatic transmission,
   wherein the starting clutch controller determines whether rotation trajectory control is being executed,
   wherein the starting clutch controller increases the transmission torque capacity of the starting clutch, when the starting clutch controller determines that the shift command has been issued while the rotation trajectory control is executed, and the shift of the automatic transmission that occurs during the transmission torque capacity control is an upshift, to thereby decrease the power source rotational speed from a desired trajectory, and
   wherein the starting clutch controller decreases the transmission torque capacity of the starting clutch, when the starting clutch controller determines that the shift command has issued while the rotation trajectory control is executed, and the shift of the automatic transmission that occurs during the transmission torque capacity control is an upshift, to thereby increase the power source rotational speed from the desired trajectory.

2. The starting clutch control device as claimed in claim 1,
   wherein the automatic transmission is an automated manual transmission in which the shift stages are divided into a plurality of groups, and the starting clutch is provided for each group of shift stages such that the automatic transmission comprises a plurality of starting clutches, to perform the shift operation by generating a rotation state change of the automatic transmission by a changeover of the transmission path caused by engaging/releasing of the plurality of starting clutches, and
   wherein the starting clutch controller causes the transmission torque capacity change of the starting clutch which occurs at shifting of the automated manual transmission to be performed during the changeover of the plurality of starting clutches and prior to occurrence of the rotation state change of the automated manual transmission.

3. The starting clutch control device as claimed in claim 1,
   wherein the automatic transmission is an automated manual transmission in which the shift stages are divided into a plurality of groups, and the starting clutch is provided for each group of shift stages such that the automatic transmission comprises a plurality of starting clutches, to perform the shift operation by generating a rotation state change of the automatic transmission by a switchover of the transmission path caused by changeover of engaging/releasing of the plurality of starting clutches, and wherein the starting clutch controller causes the transmission torque capacity change of the starting clutch which occurs at shifting of the automated manual transmission to be performed during the rotation state change of the automated manual transmission, which has occurred due to the changeover of the plurality of starting clutches.

4. The starting clutch control device as claimed in claim 3, wherein, when the shift operation is a downshift and the rotation speed of the power source is lower than the rotation speed of the starting clutch output after shifting, the starting clutch controller changes the rotation trajectory in a rotation increasing direction by decreasing a transmission torque capacity of the starting clutch prior to the changeover of the plurality of starting clutches.

* * * * *